United States Patent
Cummins et al.

(10) Patent No.: US 11,820,332 B2
(45) Date of Patent: Nov. 21, 2023

(54) STORAGE ASSEMBLY OF VEHICLE

(71) Applicant: SL Technical Solutions Inc., Newmarket (CA)

(72) Inventors: Charlie Cummins, Newmarket (CA); Simon Davies, Newmarket (CA); Paul Drury, Bradford (CA); Danielle Bartlett, Keswick (CA)

(73) Assignee: SL Technical Solutions Inc., Newmarket (CA)

( * ) Notice: Subject to any disclaimer, the term of this patent is extended or adjusted under 35 U.S.C. 154(b) by 0 days.

(21) Appl. No.: 17/993,081

(22) Filed: Nov. 23, 2022

(65) Prior Publication Data

US 2023/0158962 A1    May 25, 2023

Related U.S. Application Data

(60) Provisional application No. 63/282,290, filed on Nov. 23, 2021.

(51) Int. Cl.
*B60R 9/04* (2006.01)
*B60R 9/042* (2006.01)

(52) U.S. Cl.
CPC .................... *B60R 9/042* (2013.01)

(58) Field of Classification Search
CPC .... B60R 9/042; B60P 1/30; B60P 1/28; B60P 1/32

USPC ......... 414/462–466; 224/309, 310, 315, 319, 224/321, 325, 326
See application file for complete search history.

(56) References Cited

U.S. PATENT DOCUMENTS

| | | | |
|---|---|---|---|
| 8,496,147 B2 * | 7/2013 | Binder | B60R 9/04 224/326 |
| 10,293,734 B2 * | 5/2019 | Nash | B60P 1/32 |
| 10,814,793 B2 * | 10/2020 | Harrell | B60R 9/042 |
| 2007/0175936 A1 * | 8/2007 | Goyanko | B60R 9/042 224/309 |

* cited by examiner

*Primary Examiner* — Lynn E Schwenning
(74) *Attorney, Agent, or Firm* — Own Innovation; James W. Hinton

(57) ABSTRACT

A storage assembly includes a movable assembly configured to receive and support the weight of the load. The storage assembly also includes a base assembly configured to be fixedly mounted to the load-bearing portions of the vehicle roof of the vehicle. The base assembly is also configured to support movement of the movable assembly with the load, between a load-storage position and a load-access position, when the base assembly, in use, is fixedly mounted to the load-bearing portions of the vehicle roof, and the movable assembly, in use, receives and supports the weight of the load.

19 Claims, 14 Drawing Sheets

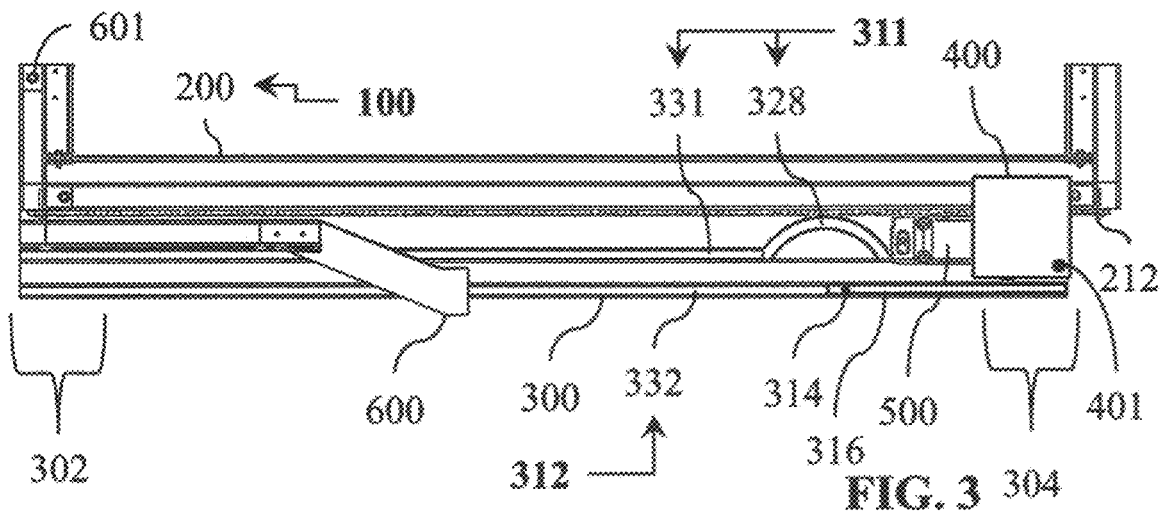
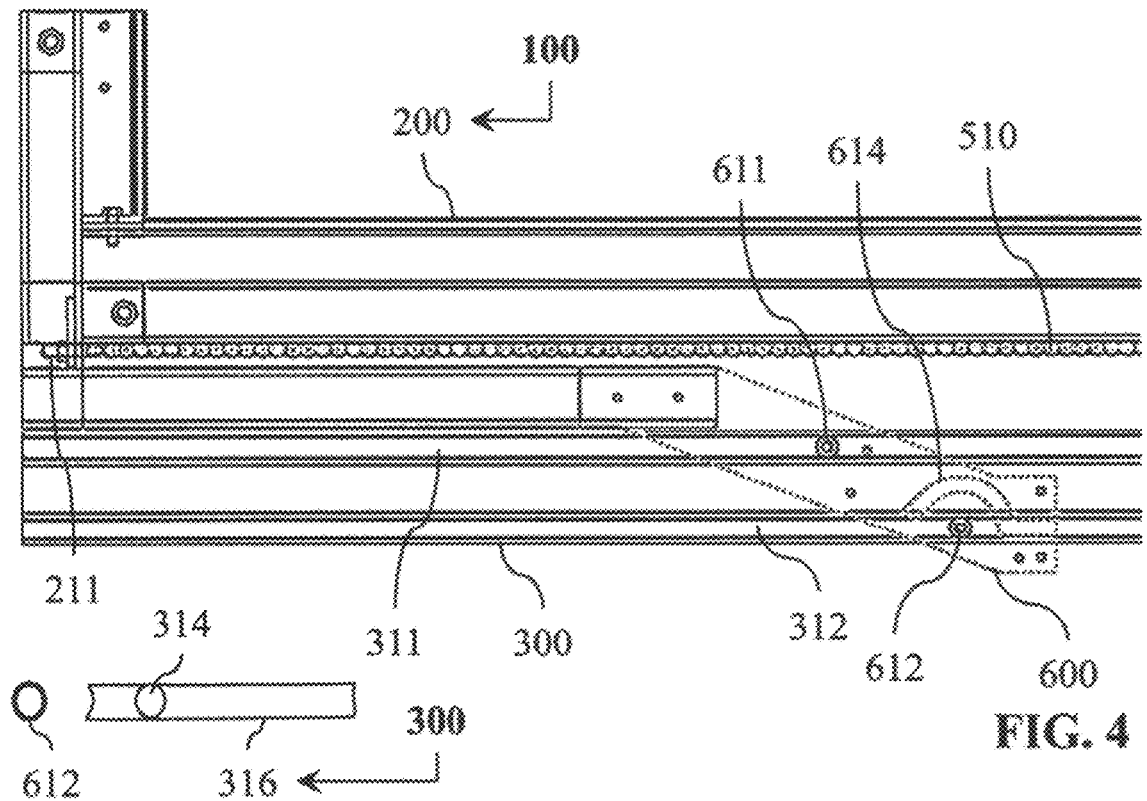

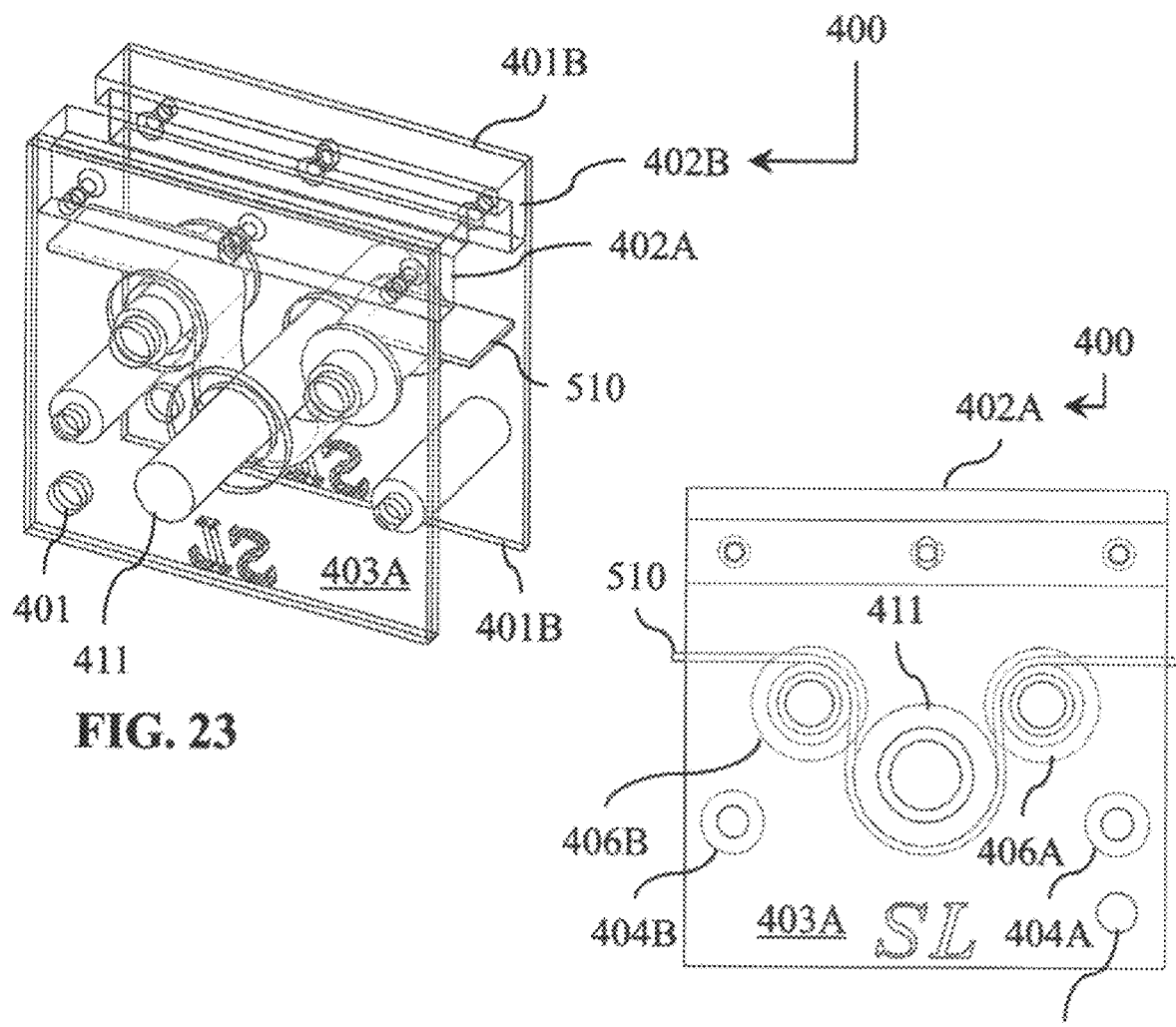
FIG. 23
FIG. 24
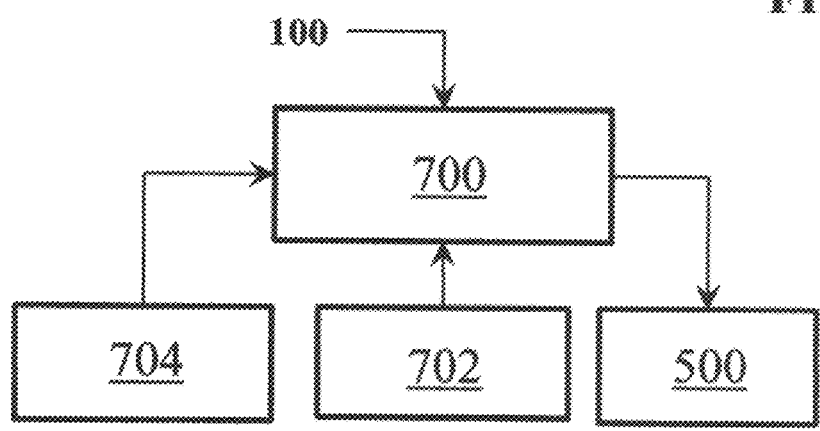
FIG. 25

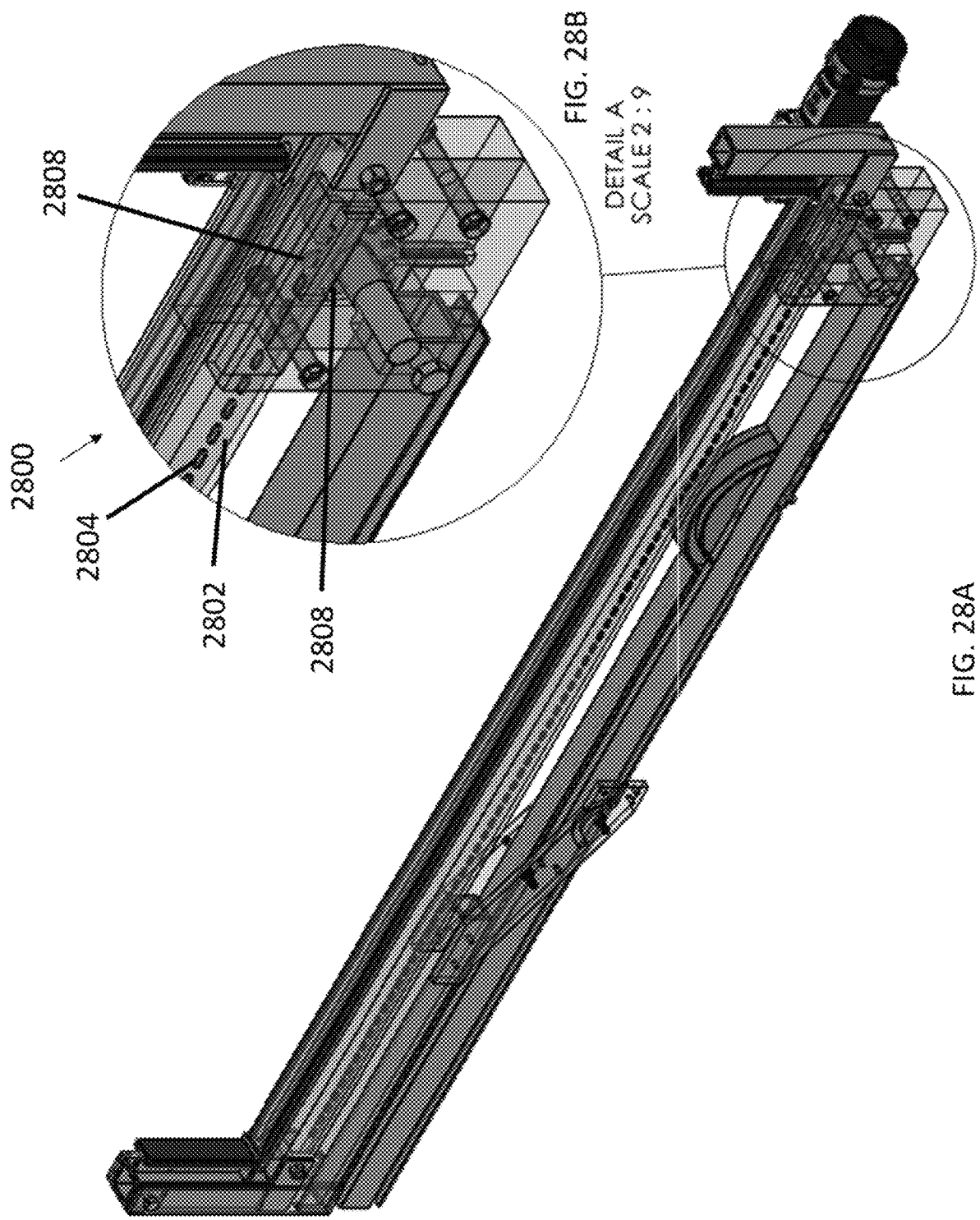

STORAGE ASSEMBLY OF VEHICLE

TECHNICAL FIELD

This document relates to the technical field of (and is not limited to) (A) a storage assembly for use with a load and a vehicle; and (B) a synergistic combination of a storage assembly and a vehicle for use with a load; and (C) a method for storage of a load relative to a vehicle.

BACKGROUND

Known storage systems are mounted to a vehicle's roof (such as a car, truck, van, etc.) and are configured to support a load.

SUMMARY

It will be appreciated that there exists a need to mitigate (at least in part) at least one problem associated with the known storage systems. After much study and experimentation with known storage systems, an understanding of the problem and a solution thereto have been identified as follows:

An apparatus is provided (in accordance with a first major aspect) to mitigate, at least in part, at least one problem associated with the existing technology. The apparatus is for use with a load and a vehicle. The vehicle has a vertical lateral side section and a vehicle roof with load-bearing portions. The apparatus includes and is not limited to (comprises) a storage assembly. The storage assembly includes and is not limited to a movable assembly configured to receive and support the weight of the load. The storage assembly includes a base assembly configured to be fixedly mounted to the load-bearing portions of the vehicle roof of the vehicle. The base assembly is also configured to support the movement of the movable assembly with the load between a load-storage position and a load-access position. This movement may be done (in such a way) when the base assembly, in use, is fixedly mounted to the load-bearing portions of the vehicle roof, and the movable assembly, in use, receives and supports the weight of the load.

An apparatus is provided (in accordance with a second major aspect) to mitigate, at least in part, at least one problem associated with the existing technology. The apparatus is for use with a load. The apparatus includes and is not limited to (comprises) a vehicle having a vertical lateral side section and also having a vehicle roof with load-bearing portions. The apparatus also includes a storage assembly. The storage assembly includes a movable assembly configured to receive and support the weight of the load. The storage assembly includes a base assembly configured to be fixedly mounted to the load-bearing portions of the vehicle roof of the vehicle. The base assembly is also configured to support the movement of the movable assembly with the load between a load-storage position and a load-access position. This movement is done (in such a way) when the base assembly, in use, is fixedly mounted to the load-bearing portions of the vehicle roof, and the movable assembly, in use, receives and supports the weight of the load.

A method is provided (in accordance with a third major aspect) to mitigate, at least in part, at least one problem associated with the existing technology. The method is for storage of a load relative to a vehicle having a vertical lateral side section and also having a vehicle roof with load-bearing portions. The method includes and is not limited to (comprises) using a movable assembly to receive and support the weight of the load. The method also includes fixedly mounting a base assembly to the load-bearing portions of the vehicle roof of the vehicle. The method also includes using the base assembly to support the movement of the movable assembly with the load between a load-storage position and a load-access position. This movement is done (in such a way) when the base assembly, in use, is fixedly mounted to the load-bearing portions of the vehicle roof, and the movable assembly, in use, receives and supports the weight of the load.

Other aspects are identified in the claims. Other aspects and features of the non-limiting embodiments may become apparent to those skilled in the art upon reviewing the following detailed description of the non-limiting embodiments with the accompanying drawings. This summary introduces concepts in a simplified form that are further described below in the detailed description. This summary is not intended to identify potential key features or possible essential features of the disclosed subject matter and is not intended to describe each disclosed embodiment or implementation of the disclosed subject matter. Many other novel advantages, features, and relationships will become apparent as this description proceeds. The Figures and the description that follow more particularly exemplify illustrative embodiments.

Provided is an apparatus for use with a load and a vehicle having a vertical lateral side section and a vehicle roof including load-bearing portions, the apparatus including a storage assembly, including a movable assembly configured to receive the load and support the weight of the load and a base assembly configured to be fixedly mounted to the load-bearing portions of the vehicle roof, the base assembly further configured to support movement of the movable assembly with the load, between a load-storage position and a load-access position, when the base assembly, in use, is fixedly mounted to the load-bearing portions of the vehicle roof, and the movable assembly, in use, receives the load and supports the weight of the load.

In the load-storage position, the movable assembly may be disposed proximate to, and above, the vehicle roof, and the movable assembly may be alignable in a first orientation so that the load, in use, is transportable by the vehicle.

In the load-access position, the movable assembly may be disposed proximate to the vertical lateral side section of the vehicle, and the movable assembly may be alignable in a second orientation so that the load is removable from, or loadable onto, the movable assembly.

The apparatus may further comprise a linkage assembly configured to be pivotally connected to the movable assembly, and further configured to be pivotally linked to the base assembly.

The linkage assembly may be further configured to facilitate linear movement of the movable assembly horizontally along an outboard movement direction, from the load-storage position, in which the movably assembly is disposed above the vehicle roof, toward a tippable position beyond which the movable assembly is rotatable.

The linkage assembly may be further configured to facilitate rotational movement of the movable assembly along a rotation movement direction from the tippable position toward a non-horizontal orientation in which the movable assembly is disposed proximate to the vertical lateral side section of the vehicle so that the load is removable from, or loadable onto, the movable assembly when the movable assembly is disposed at the non-horizontal orientation.

The linkage assembly may be further configured to facilitate rotational movement of the movable assembly along a counter-rotation movement direction, from a non-horizontal orientation, in which the movable assembly is disposed proximate to the vertical lateral side section of the vehicle, toward a tippable position in which the movable assembly is positionable in horizontal alignment relative to the vehicle roof.

The linkage assembly may be further configured to facilitate linear movement of the movable assembly horizontally along an inboard movement direction, away from the tippable position and toward the load-storage position disposed above the vehicle roof.

The base assembly may include an inboard end section disposed proximate to the vertical lateral side section of the vehicle, an outboard end section spaced apart from the inboard end section, the outboard end section disposed distally from the vertical lateral side section of the vehicle, and a base pivot fixedly disposed proximate to the outboard end section, the base pivot configured to interact with the linkage assembly.

The base assembly may further include a first elongated track configured to extend between the inboard end section and the outboard end section, the first elongated track configured to interact with the linkage assembly, and a second elongated track configured to extend between the inboard end section and the outboard end section, the second elongated track configured to interact with the linkage assembly. The first elongated track and the second elongated track may be spaced apart from each other and may be alignable, at least in part, parallel with each other.

The first elongated track may include a curved track section disposed proximate to the outboard end section, the curved track section configured to arch toward the movable assembly and a first elongated track section extending between the inboard end section and the curved track section, the first elongated track section disposed proximate to the outboard end section.

The second elongated track may include a second elongated track section extending from the inboard end section to the outboard end section.

The linkage assembly may include a first pin configured to be slidably movable along the first elongated track of the base assembly, a second pin configured to be slidably movable along the second elongated track of the base assembly, and a cam surface configured to slidably interact with the base pivot of the base assembly.

The cam surface may include a straight cam surface configured to linearly slidably interact with the base pivot of the base assembly so that the linkage assembly together with the movable assembly are linearly movable and a curved cam surface configured to rotatably slidably interact with the base pivot of the base assembly so that the linkage assembly together with the movable assembly are rotatably movable. After the tippable position is reached for the movable assembly, the movable assembly may be rotatable when the base pivot is positioned where the curved cam surface and the straight cam surface intersect with each other.

The apparatus may further comprise a coupler assembly configured to be pivotally mounted to an outboard end section of the base assembly, the outboard end section disposed proximate to the vertical lateral side section of the vehicle when the base assembly, in use, is fixedly mounted to the load-bearing portions of the vehicle roof.

The coupler assembly may be further configured to be slide coupled to the movable assembly in such a way that the coupler assembly facilitates sliding movement of a length of the movable assembly along an inboard movement direction extending between a first lateral end section and a second lateral end section of the movable assembly.

The apparatus may further comprise an actuator assembly configured to be fixedly mounted to the coupler assembly, the actuator assembly further configured to be drive coupled to the movable assembly. The actuator assembly may be further configured to selectively urge movement of the movable assembly, relative to the coupler assembly, along an inboard movement direction extending between a first lateral end section and a second lateral end section of the movable assembly.

The actuator assembly may be further configured to move the movable assembly along an outboard movement direction extending from the first lateral end section toward the second lateral end section of the movable assembly and the inboard movement direction extending from the second lateral end section toward the first lateral end section of the movable assembly.

The apparatus may further comprise a flexible elongated drive member. The movable assembly may be configured to be affixed to the flexible elongated drive member. The actuator assembly may be further configured to be coupled to the flexible elongated drive member. The actuator assembly may be further configured to move the flexible elongated drive member to thereby move the movable assembly.

The movable assembly may further include a first connection terminal configured to be affixed to a first end of the flexible elongated drive member and a second connection terminal configured to be affixed to a second end of the flexible elongated drive member.

The movable assembly may include spaced-apart movable rails and spaced-apart brace members configured to span between the spaced-apart movable rails.

The apparatus may further include a coupler assembly configured to be pivotally mounted to an outboard end section of the base assembly, the outboard end section disposed proximate to the vertical lateral side section of the vehicle when the base assembly, in use, is fixedly mounted to the load-bearing portions of the vehicle roof and a flexible elongated drive member including an elongated chain assembly having links coupled one after another. The coupler assembly may include plates spaced apart from each other, slide engagement devices configured to slidably engage with the movable assembly, spacers configured to be positioned between the plates and further configured to maintain the plates in a spaced-apart relationship with each other, guides configured to guide movement of the flexible elongated drive member, a sprocket configured to engage with the elongated chain assembly, a rotatable axle configured to span across the plates and further configured to support the sprocket, and bearings configured to be mounted to the plates and further configured to support the rotatable axle.

The apparatus may further include a coupler assembly configured to be pivotally mounted to an outboard end section of the base assembly, the outboard end section disposed proximate to the vertical lateral side section of the vehicle when the base assembly, in use, is fixedly mounted to the load-bearing portions of the vehicle roof and a flexible elongated drive member including an elongated belt assembly. The coupler assembly may further include plates spaced apart from each other, slide engagement devices configured to slidably engage with the movable assembly, spacers configured to be positioned between the plates and further configured to maintain the plates in a spaced-apart relationship with each other, guides configured to guide movement of the flexible elongated drive member, a rotatable axle configured to span across the plates and further configured to frictionally contact the elongated belt assembly, and bearings configured to be mounted to the plates and further configured to support the rotatable axle.

The apparatus may further include a coupler assembly configured to be pivotally mounted to an outboard end section of the base assembly, the outboard end section disposed proximate to the vertical lateral side section of the vehicle when the base assembly, in use, is fixedly mounted to the load-bearing portions of the vehicle roof, an actuator assembly configured to be fixedly mounted to the coupler assembly, the actuator assembly further configured to be drive coupled to the movable assembly, and the actuator assembly further configured to selectively urge movement of the movable assembly, relative to the coupler assembly, along an inboard movement direction extending between a first lateral end section and a second lateral end section of the movable assembly, a control circuit configured to interface with, and to control, the actuator assembly, a sensor assembly configured to be disposed proximate to the movable assembly and further configured to determine a position of the movable assembly, and a control switch configured to interface with, and control, the actuator assembly in such a way that the actuator assembly, in use, controls a direction of movement of the movable assembly.

The movable assembly may include a first movable rail and a second movable rail spaced apart from the first movable rail. An actuator assembly may be configured to selectively move the first movable rail and the second movable rail. The actuator assembly may include a motor affixed to, and supported by, the base assembly. The motor may include a rotatable motor shaft configured to rotate a gear-box assembly having an input shaft, a first output shaft and a second output shaft. The input shaft may be configured to be coupled to the rotatable motor shaft of the motor. The first output shaft may be configured to be coupled to a first flexible elongated drive member. The first flexible elongated drive member may be configured to be affixed to the first movable rail. The second output shaft may be configured to be coupled to a second flexible elongated drive member. The second flexible elongated drive member may be configured to be affixed to the second movable rail.

The apparatus may further include a lock device configured to selectively lock, and unlock, a second rotatable axle to a second coupler assembly. When the lock device selectively locks the second rotatable axle to the second coupler assembly, the motor may be configured to drive the first movable rail and the second movable rail, in unison. When the lock device selectively unlocks the second rotatable axle relative to the second coupler assembly, the second movable rail may be movable so that the second movable rail is alignable with the first movable rail. The lock device may be further configured to selectively lock the second rotatable axle with the second coupler assembly so that, after the second movable rail and the first movable rail are aligned with each other, the first movable rail and the second movable rail are movable in unison.

Provided is an apparatus for use with a load, the apparatus including a vehicle having a vertical lateral side section and a vehicle roof with load-bearing portions, and a storage assembly, including a movable assembly configured to receive the load and support the weight of the load and a base assembly configured to be fixedly mounted to the load-bearing portions of the vehicle roof of the vehicle. The base assembly is further configured to support movement of the movable assembly with the load, between a load-storage position and a load-access position, when the base assembly, in use, is fixedly mounted to the load-bearing portions of the vehicle roof, and the movable assembly, in use, receives the load and supports the weight of the load.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 3 and FIG. 4 depict side views (FIG. 3 and FIG. 4) of embodiments of the storage assembly of FIG. 1; and FIG. 5A and FIG. 5B depict a side view (FIG. 5A) and a top view (FIG. 5B) of embodiments of a base assembly of the storage assembly of FIG. 4; and FIG. 5C depicts a side view of an embodiment of a linkage assembly of the storage assembly of FIG. 4; FIG. 23 and FIG. 24 depict a front perspective view (FIG. 23) and a front view (FIG. 24) of embodiments of a coupler assembly of the storage assembly of FIG. 1; and FIG. 25 depicts a schematic view (FIG. 25) of an embodiment of a control circuit of the storage assembly of FIG. 1.

FIGS. 28A and 28B are a perspective and detailed views, respectively, of a rack and pinion drive, in accordance with an embodiment.

Figure 1:
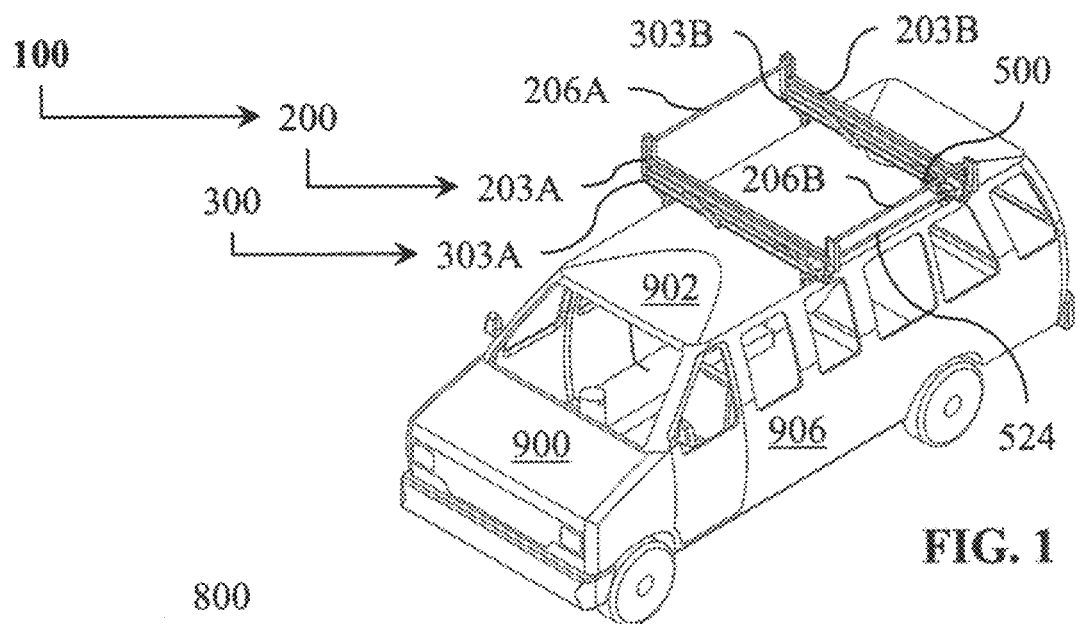
FIG. 1 and FIG. 2 depict a front perspective view (FIG. 1), and a front view (FIG. 2) of embodiments of a storage assembly.

The drawings are not necessarily to scale and may be illustrated at least in part by phantom lines, diagrammatic representations, and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common and well-understood elements useful in commercially feasible embodiments are often not depicted to provide a less obstructed view of the embodiments of the present disclosure.

LISTING OF REFERENCE NUMERALS
USED IN THE DRAWINGS

| | |
|---|---|
| storage assembly 100 | wear-resistant surface 320 |
| movable assembly 200 | linear movement direction 322 |
| first lateral end section 201 | rotational movement direction 324 |
| second lateral end section 202 | pin movement direction 326 |
| spaced-apart movable rails (203A, 203B) | curved track section 328 |
| spaced-apart brace members (206A, 206B) | first elongated track section 331 |
| first connection terminal 211 | second elongated track section 332 |
| second connection terminal 212 | coupler assembly 400 |
| elongated tubular member 214 | coupler pivot 401 |
| flat top surface 216 | plates (403A, 403B) |
| flat side surface 218 | slide engagement devices (402A, 402B) |
| flat bottom surface 220 | spacers (404A, 404B) |
| beam member 222 | roller guides (406A, 406B) |
| elongated sidetrack 224 | bearings (412A, 412B) |
| linear movement direction 226 | sprocket 408 |
| base assembly 300 | first drive guide 410A |
| spaced-apart base rails (303A, 303B) | second drive guide 410B |
| inboard end section 302 | rotatable axle 411 |
| outboard end section 304 | actuator assembly 500 |
| first elongated track 311 | movement axis 502 |
| second elongated track 312 | outboard movement direction 504 |
| base pivot 314 | inboard movement direction 506 |
| base stop 316 | elongated drive members (510A, 510B) |
| stop surface 317 | motor 512 |
| connector hole 318 | rotatable motor shaft 514 |
| rotation direction 515 | first pin 611 |
| couplers (516A, 516B, 516C, 516D, 516E) | second pin 612 |
| chain assembly 518 | pin shaft 612A |
| belt assembly 520 | curved cam surface 614 |
| gear-box assembly 521 | straight cam surface 615 |
| output shafts (522A, 522B) | linear movement direction 616 |
| input shaft 523 | rotational movement direction 618 |
| first drivable shaft 524A | control circuit 700 |
| second drivable shaft 524B | sensor assembly 702 |
| lock device 526 | control switch 704 |
| lock movement direction 527 | load 800 |
| shaft rotation direction 528 | vehicle 900 |
| lock movement direction 530 | vehicle roof 902 |

LISTING OF REFERENCE NUMERALS
USED IN THE DRAWINGS
-continued

| | |
|---|---|
| movement direction 532 | load-bearing portions 904 |
| linkage assembly 600 | vertical lateral side section 906 |
| linkage pivot 601 | |

DETAILED DESCRIPTION OF THE
NON-LIMITING EMBODIMENT(S)

The following detailed description is merely exemplary and does not limit the described embodiments or the application and uses. As used, the word "exemplary" or "illustrative" means "serving as an example, instance, or illustration." Any implementation described as "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure. The claims define the scope of the disclosure. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary, or the following detailed description. It is also to be understood that the devices and processes illustrated in the attached drawings, and described in the following specification, are exemplary embodiments (examples), aspects, and/or concepts defined in the appended claims. Hence, dimensions and other physical characteristics relating to the embodiments disclosed are not considered limiting unless the claims expressly state otherwise. It is understood that the phrase "at least one" is equivalent to "a." The aspects (examples, alterations, modifications, options, variations, embodiments, and any equivalent thereof) are described regarding the drawings. The disclosure is limited to the subject matter provided by the claims. The disclosure is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless expressly stated otherwise.

Figure 2:
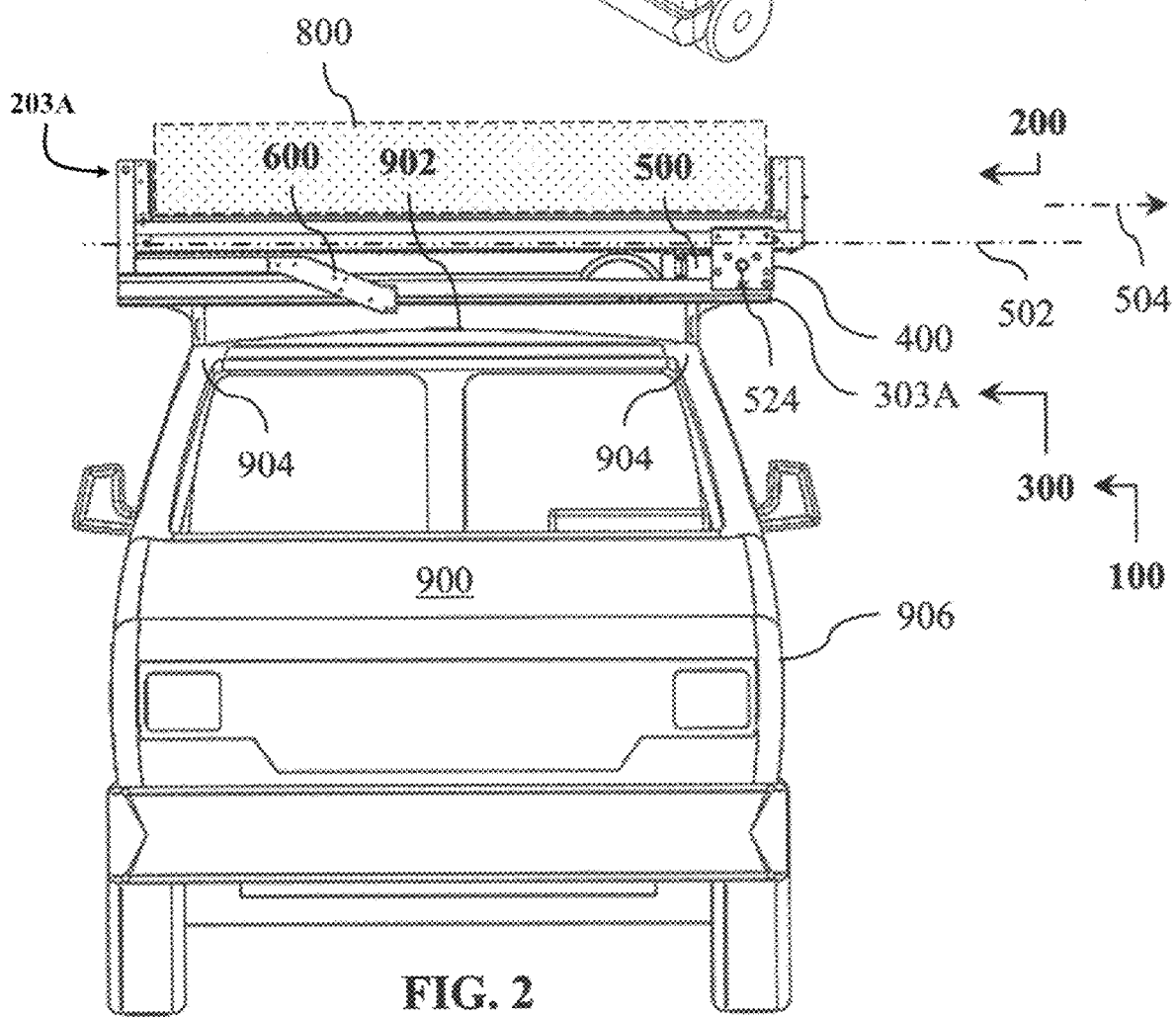

FIG. 1 and FIG. 2 (SHEET 1 of 12 SHEETS) depict a front perspective view (FIG. 1) and a front view (FIG. 2) of embodiments of a storage assembly 100.

Referring to the embodiments depicted in FIG. 1 and FIG. 2, the storage assembly 100 includes a movable assembly 200 and a base assembly 300. The base assembly 300 is fixedly mounted to a vehicle roof 902 of a vehicle 900. In accordance with a preferred embodiment, the base assembly 300 is mounted to mounting feet (not depicted) that are fixedly attached to the roof of the vehicle 900. An embodiment of the mounting feet includes the SAVANA mounting feet Part Number GMMBK2W, manufactured by the Adrian Steel Company headquartered in the U.S.A. The movable assembly 200 is movable (selectively movable) relative to the base assembly 300. The movable assembly 200 is configured to receive and support a load 800. The base assembly 300 is configured to support the movable assembly

Figure 17:
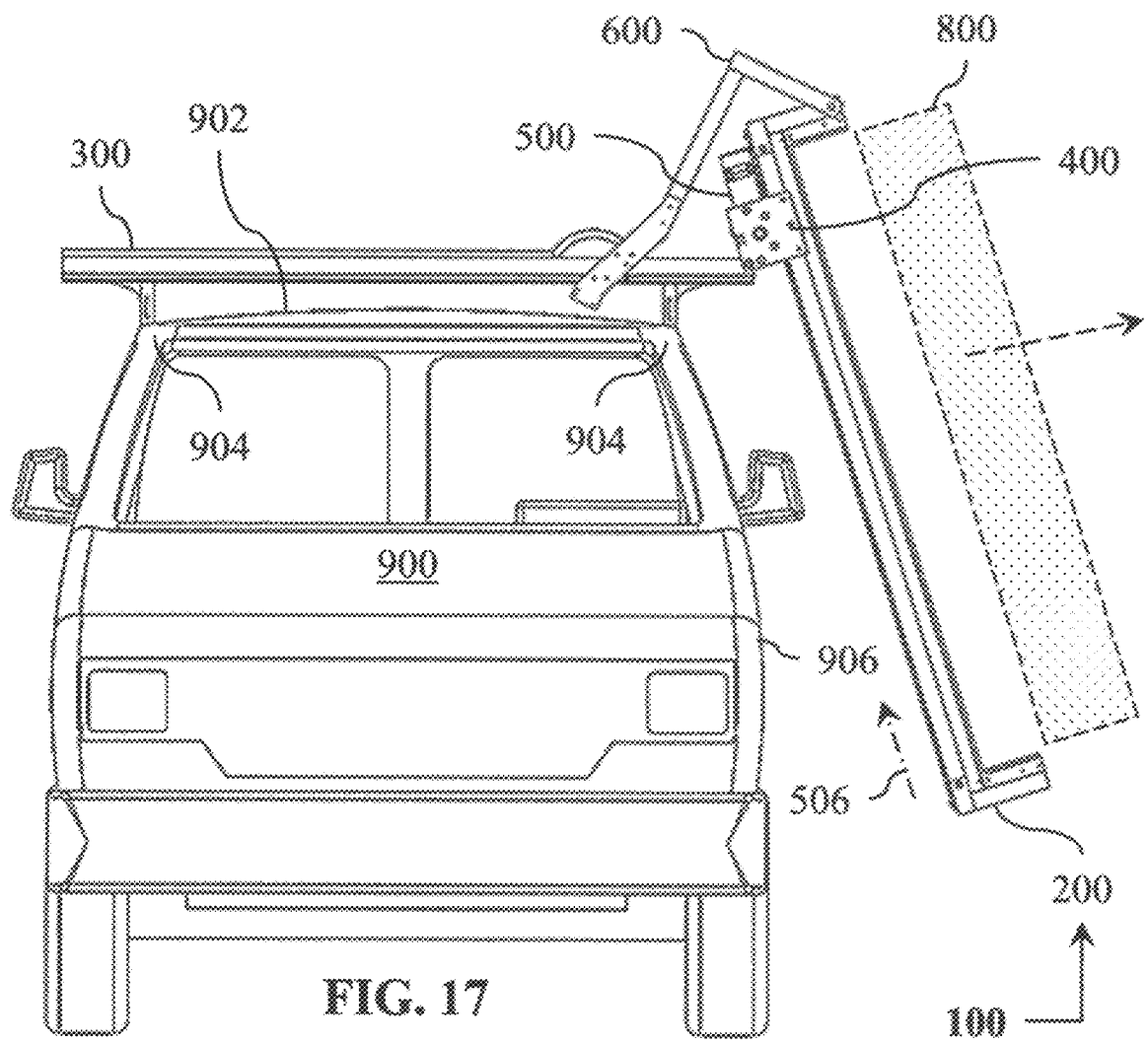

200 with the load 800. The movable assembly 200 (with the load 800) is selectively movable between a position disposed proximate to (near) the vehicle roof 902 (as depicted in FIG. 2) and a loading position disposed proximate to (near) a vertical lateral side section 906 of a vehicle 900 (as depicted in FIG. 17). The loading position is where the load 800 is placed onto the movable assembly 200 or is removed from the movable assembly 200.

Referring to the embodiments depicted in FIG. 1, the movable assembly 200 includes spaced-apart movable rails (203A, 203B), or at least two or more movable rails. The movable assembly 200 also includes spaced-apart brace members (206A, 206B) spanning between the spaced-apart movable rails (203A, 203B). The foregoing components advantageously provide improved structural support for the movable assembly 200.

Referring to the embodiments depicted in FIG. 1, in accordance with a preferred embodiment, the base assembly 300 includes spaced-apart base rails (303A, 303B): a first base rail 303A and a second base rail 303B, or at least two or more spaced-apart base rails. The actuator assembly 500 is affixed to (and supported by) the base assembly 300 (either directly or indirectly). As depicted in FIG. 1, the actuator assembly 500 is, preferably, affixed to the second base rail 303B, but may be mounted where convenient. The actuator assembly 500 is coupled to a drivable shaft 524 configured to move (reciprocate) the movable assembly 200 along a movement axis 502.

FIG. 3 and FIG. 4 (SHEET 2 of 12 SHEETS) depict side views (FIG. 3 and FIG. 4) of embodiments of the storage assembly 100 of FIG. 1.

Referring to the embodiments depicted in FIG. 3 and FIG. 4, the movable assembly 200 is placed (positioned) in a storage position disposed over the vehicle roof 902. A closer view of the components of the storage assembly 100 is provided.

FIG. 5A and FIG. 5B (SHEET 2 of 12 SHEETS) depict a side view (FIG. 5A) and a top view (FIG. 5B) of embodiments of a base assembly 300 of the storage assembly 100 of FIG. 4.

Referring to the embodiments depicted in FIG. 5A and FIG. 5B, the components of the base assembly 300 and the linkage assembly 600 are depicted and described in greater detail below.

FIG. 5C (SHEET 2 of 12 SHEETS) depicts a side view of an embodiment of a linkage assembly 600 of the storage assembly 100 of FIG. 4.

Referring to the embodiment depicted in FIG. 5C, various components of the linkage assembly 600 and their relationships are depicted and described in greater detail below. The linkage assembly 600 may be called an arm assembly. The linkage assembly 600 is configured to permit the movable assembly 200 to move relative to the base assembly 300 in a controlled manner.

Figure 5D:
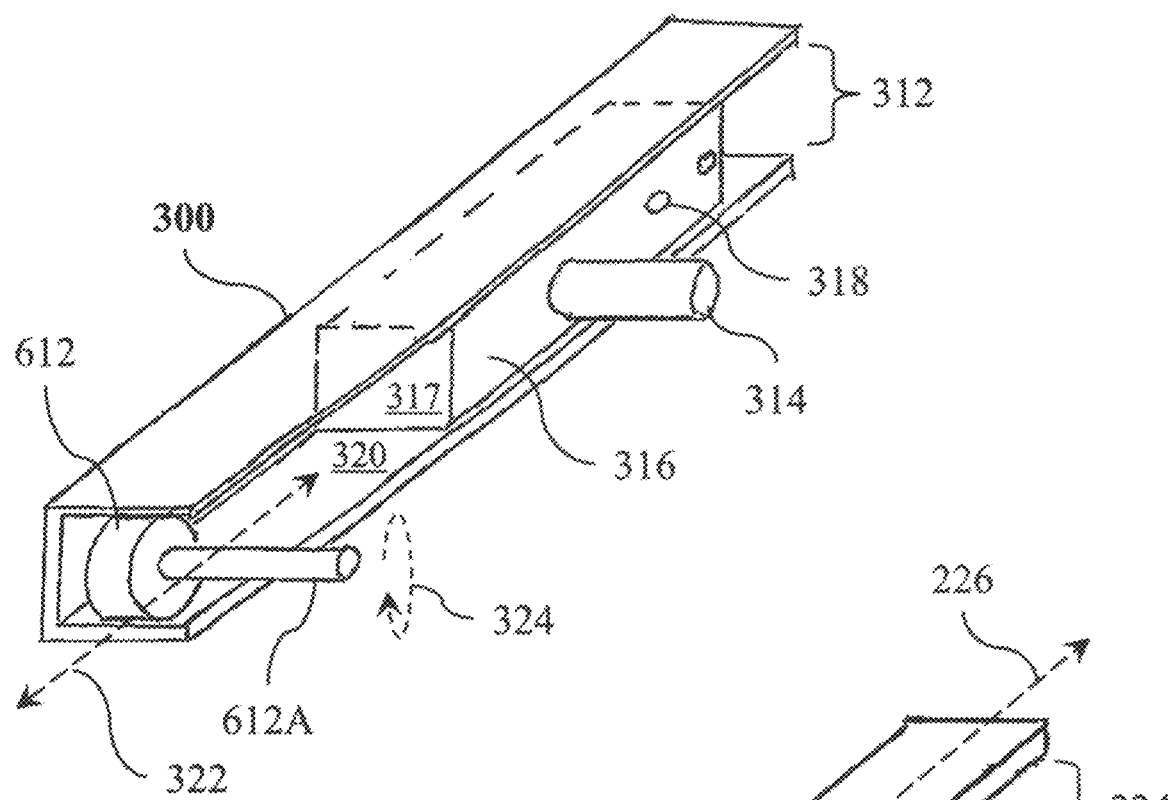
FIG. 5D depicts a perspective view of an embodiment of a base assembly of the storage assembly of FIG. 4.

FIG. 5D (SHEET 3 of 12 SHEETS) depicts a perspective view of an embodiment of a base assembly 300 of the storage assembly 100 of FIG. 4.

Referring to the embodiment depicted in FIG. 5D, various components of the base assembly 300 and their relationships are depicted and described in greater detail below.

Figure 5E:
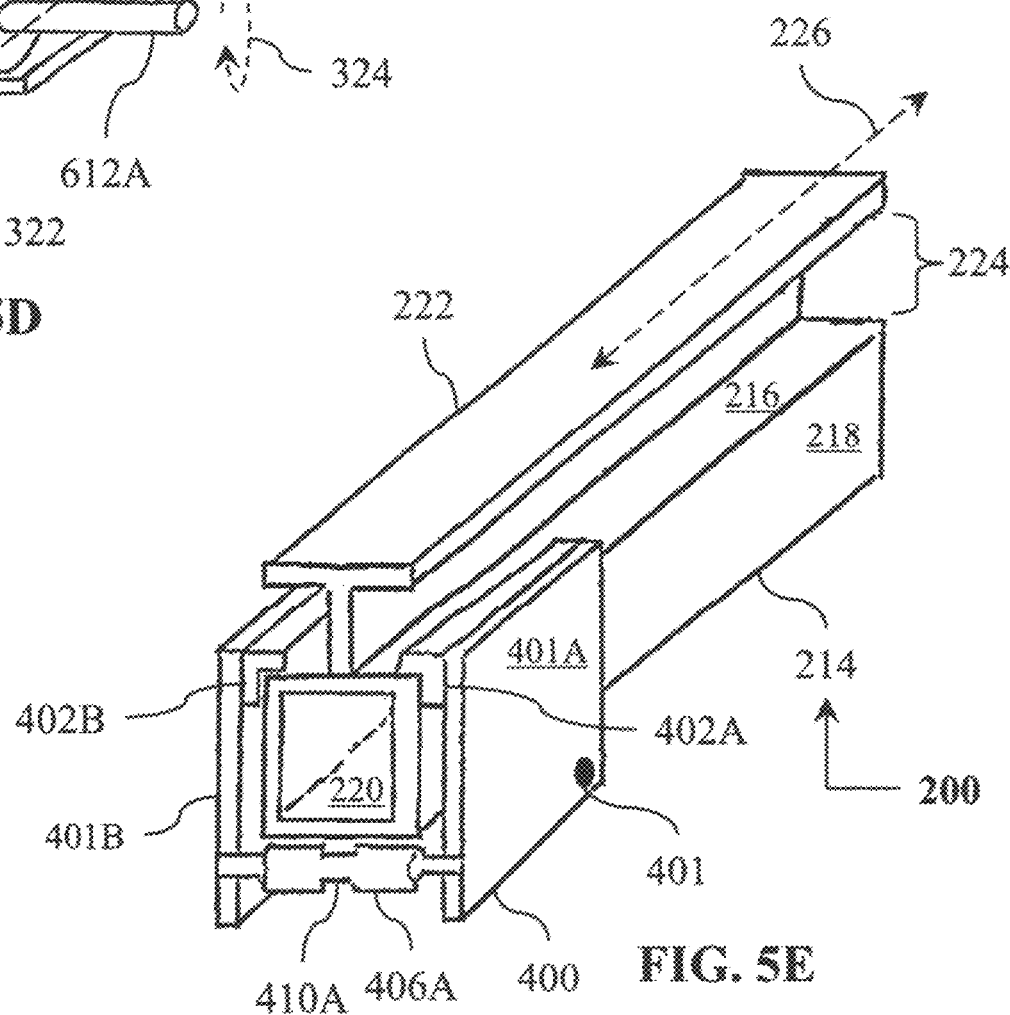
FIG. 5E depicts a perspective view of an embodiment of a movable assembly of the storage assembly of FIG. 4.

FIG. 5E (SHEET 3 of 12 SHEETS) depicts a perspective view of an embodiment of a movable assembly 200 of the storage assembly 100 of FIG. 4.

Referring to the embodiment depicted in FIG. 5E, various components of the movable assembly 200 and their relationships are depicted and described in greater detail below.

Figure 6:
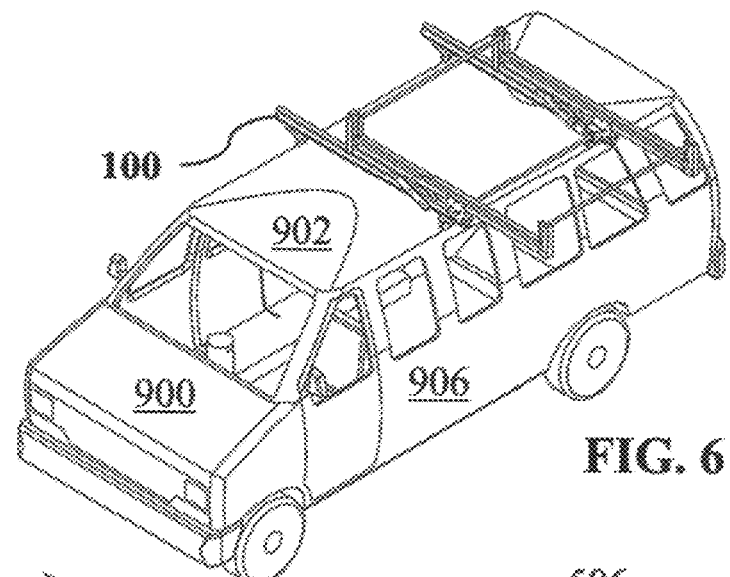
FIG. 6 and FIG. 7 depict a front perspective view (FIG. 6) and a front view (FIG. 7) of embodiments of the storage assembly of FIG. 1.
Figure 7:
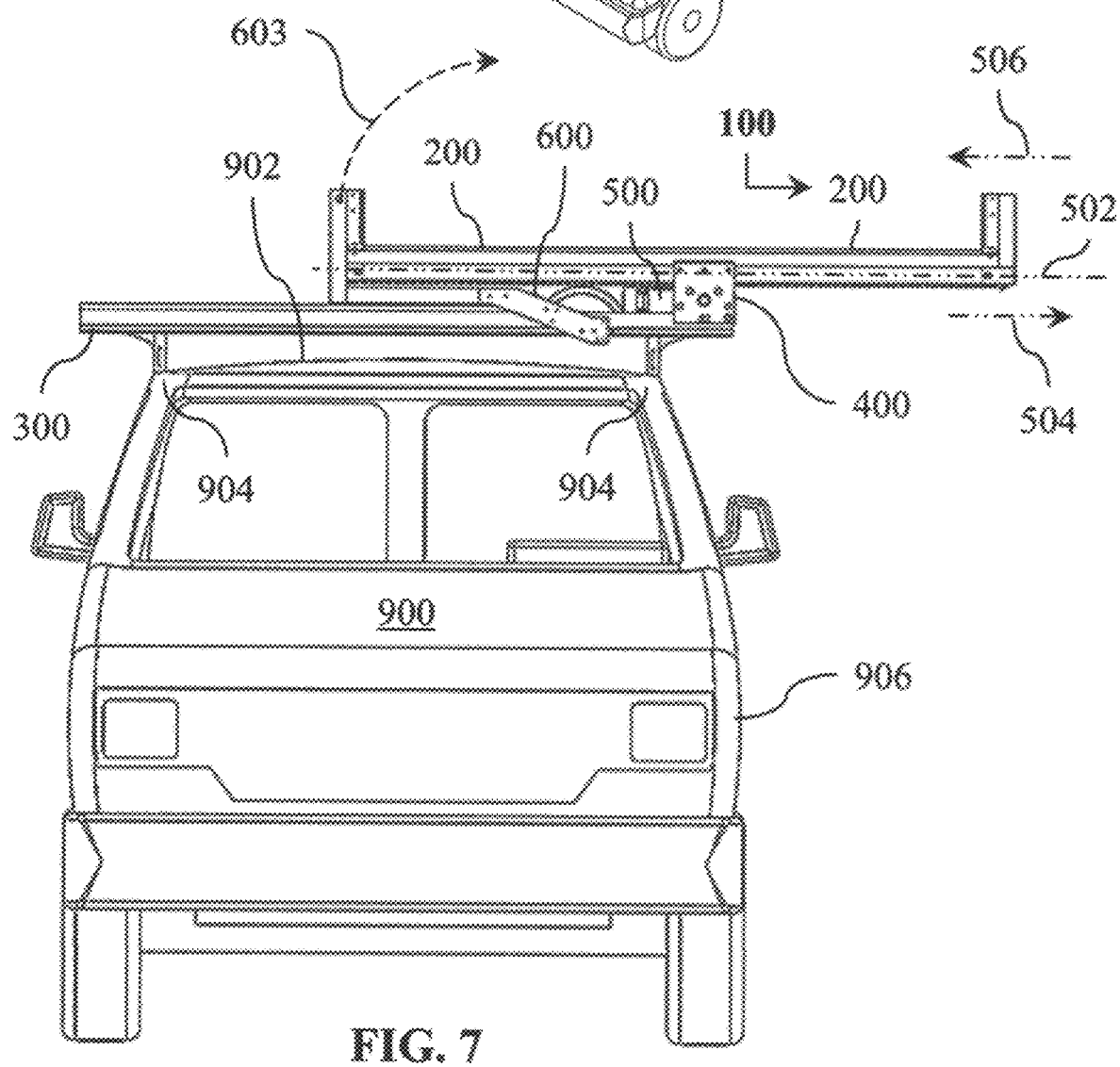

FIG. 6 and FIG. 7 (SHEET 4 of 12 SHEETS) depict a front perspective view (FIG. 6) and a front view (FIG. 7) of embodiments of the storage assembly 100 of FIG. 1.

Figure 26:
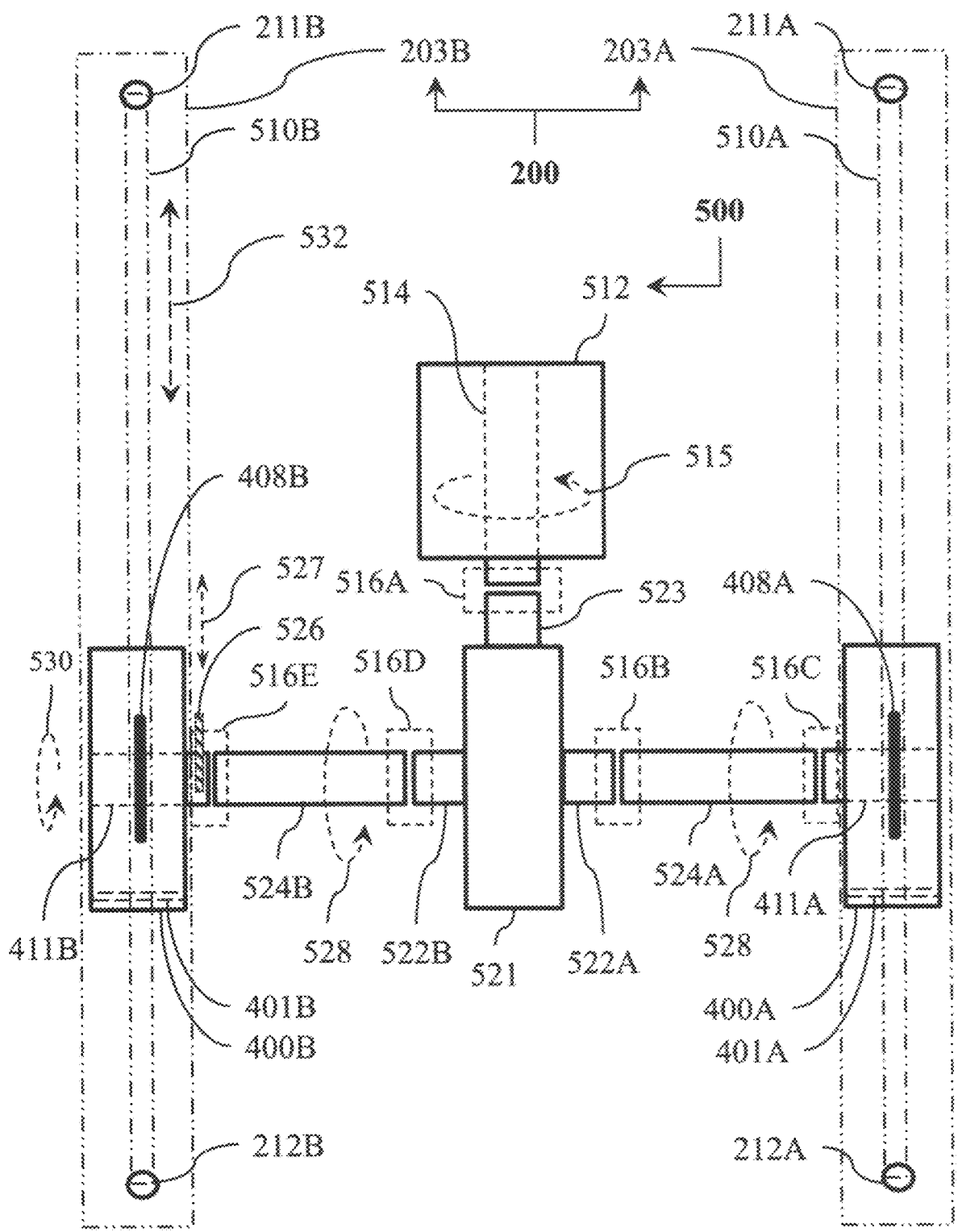
FIG. 26 depicts a top schematic view of an embodiment of an actuator assembly of the storage assembly of FIG. 1.

Referring to the embodiments depicted in FIG. 6 and FIG. 7, the movable assembly 200 is moved (selectively moved) relative to the base assembly 300 from the storage position (as depicted in FIG. 2) toward a tippable position (as depicted in FIG. 7). In the tippable position, the movable assembly 200 is in a horizontal orientation and is ready for tipping (the start of rotation). A length or portion of the movable assembly 200 extends beyond the vertical lateral side section 906 of the vehicle 900. Advantageously, the tippable position helps reduce the amount of torque output required by the actuator assembly 500 (as depicted in FIG. 26 or FIG. 1) to move the movable assembly 200 toward a loading position (unloading position) as indicated in FIG. 17.

Figure 8:
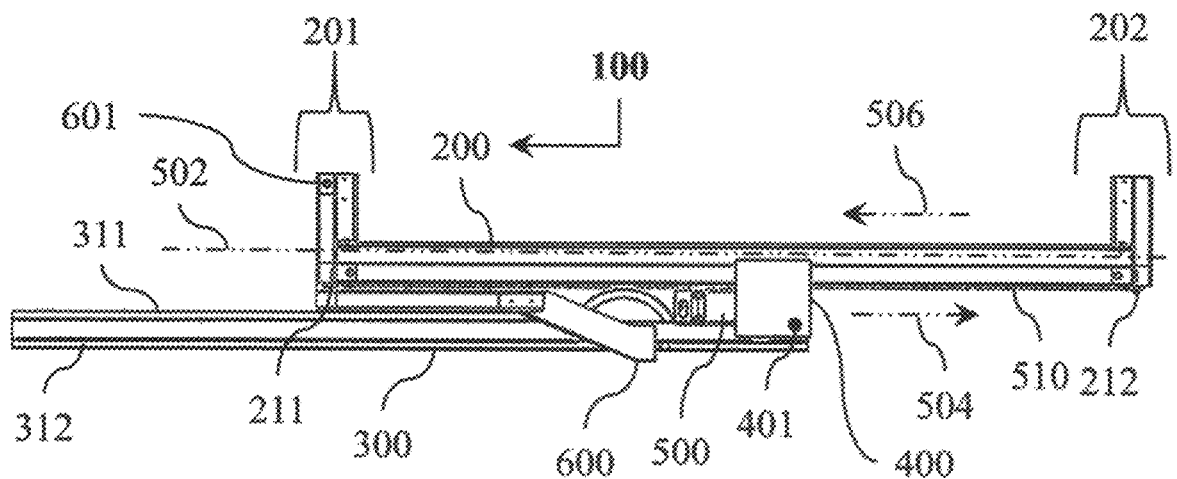
FIG. 8 and FIG. 9 depict side views (FIG. 8 and FIG. 9) of the embodiments of the storage assembly of FIG. 6.
Figure 9:
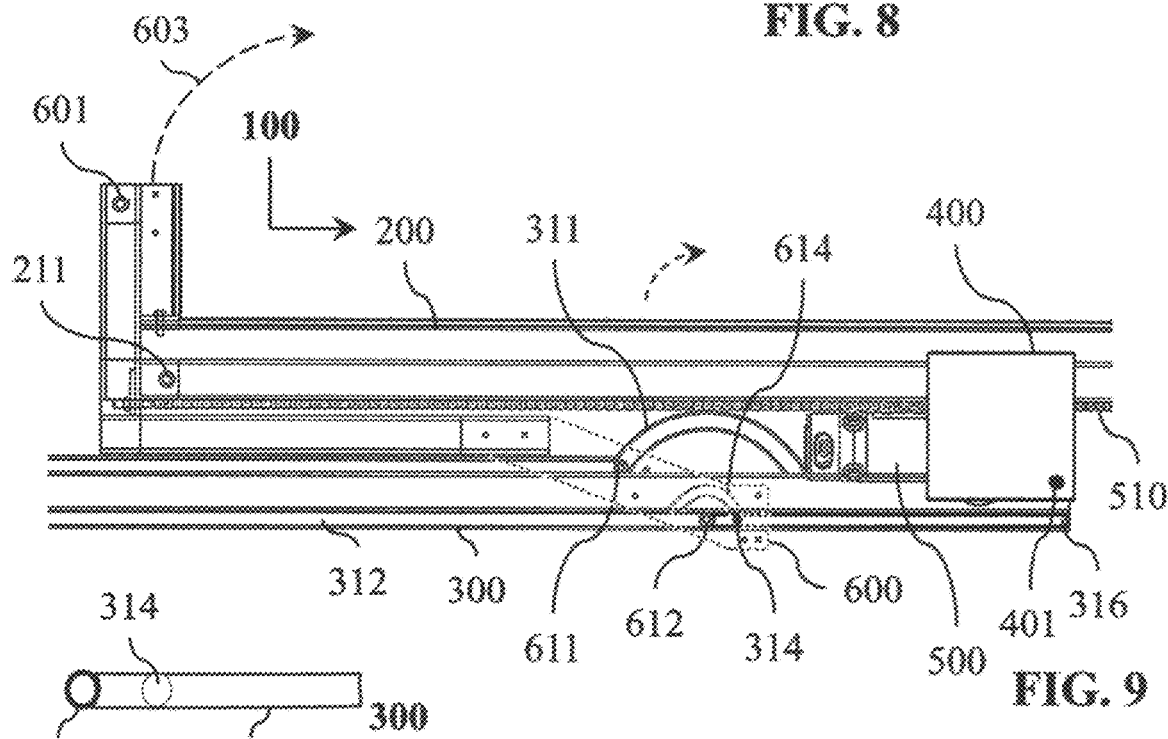

FIG. 8 and FIG. 9 (SHEET 5 of 12 SHEETS) depict side views (FIG. 8 and FIG. 9) of the embodiments of the storage assembly 100 of FIG. 6.

Referring to the embodiments depicted in FIG. 8 and FIG. 9, the movable assembly 200 is placed in a tippable position. A closer view of the components of the storage assembly 100 is depicted.

Figure 10A:
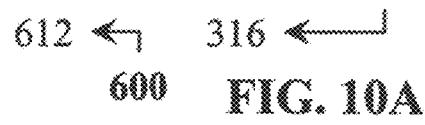
FIG. 10A and FIG. 10B depict a side view (FIG. 10A) and a top view (FIG. 10B) of embodiments of a base assembly of the storage assembly of FIG. 9.
Figure 10B:
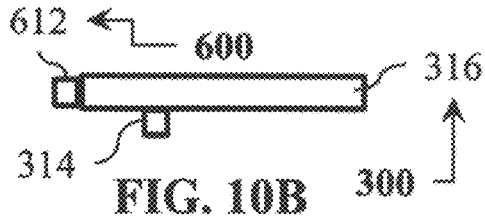

FIG. 10A and FIG. 10B (SHEET 5 of 12 SHEETS) depict a side view (FIG. 10A) and a top view (FIG. 10B) of embodiments of a base assembly 300 of the storage assembly 100 of FIG. 9.

Referring to the embodiments depicted in FIG. 10A and FIG. 10B, various components of the base assembly 300 are depicted, and are described in greater detail below.

Figure 10C:
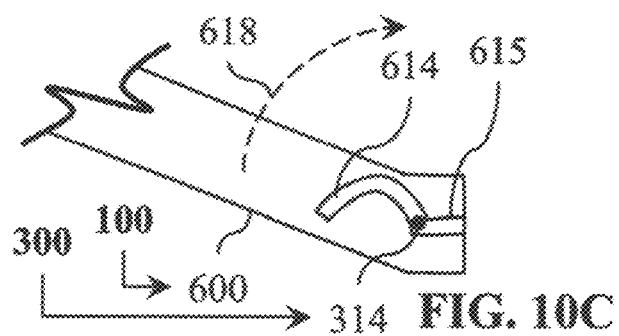
FIG. 10C depicts a side view of an embodiment of a linkage assembly of the storage assembly of FIG. 9.

FIG. 10C (SHEET 5 of 12 SHEETS) depicts a side view of an embodiment of a linkage assembly 600 of the storage assembly 100 of FIG. 9.

Referring to the embodiment depicted in FIG. 10C, various components of the linkage assembly 600 are depicted, and described in greater detail below.

Figure 11:
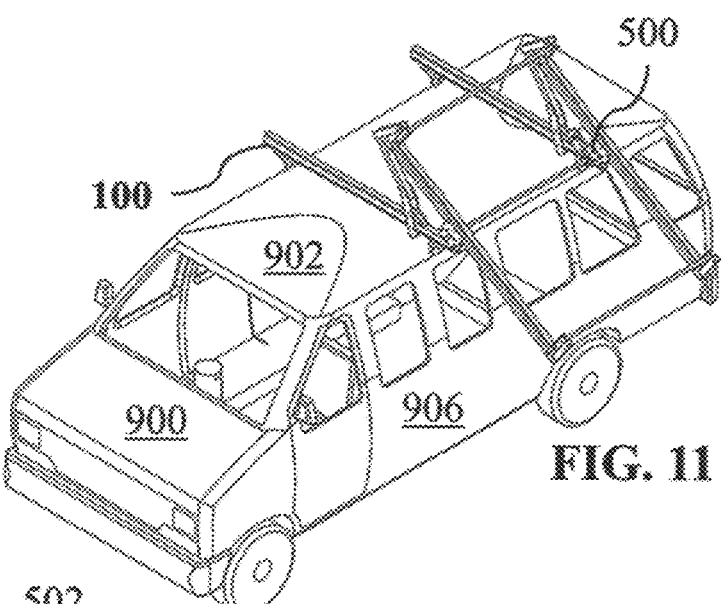
FIG. 11 and FIG. 12 depict a front perspective view (FIG. 11) and a front view (FIG. 12) of embodiments of the storage assembly of FIG. 1.
Figure 12:
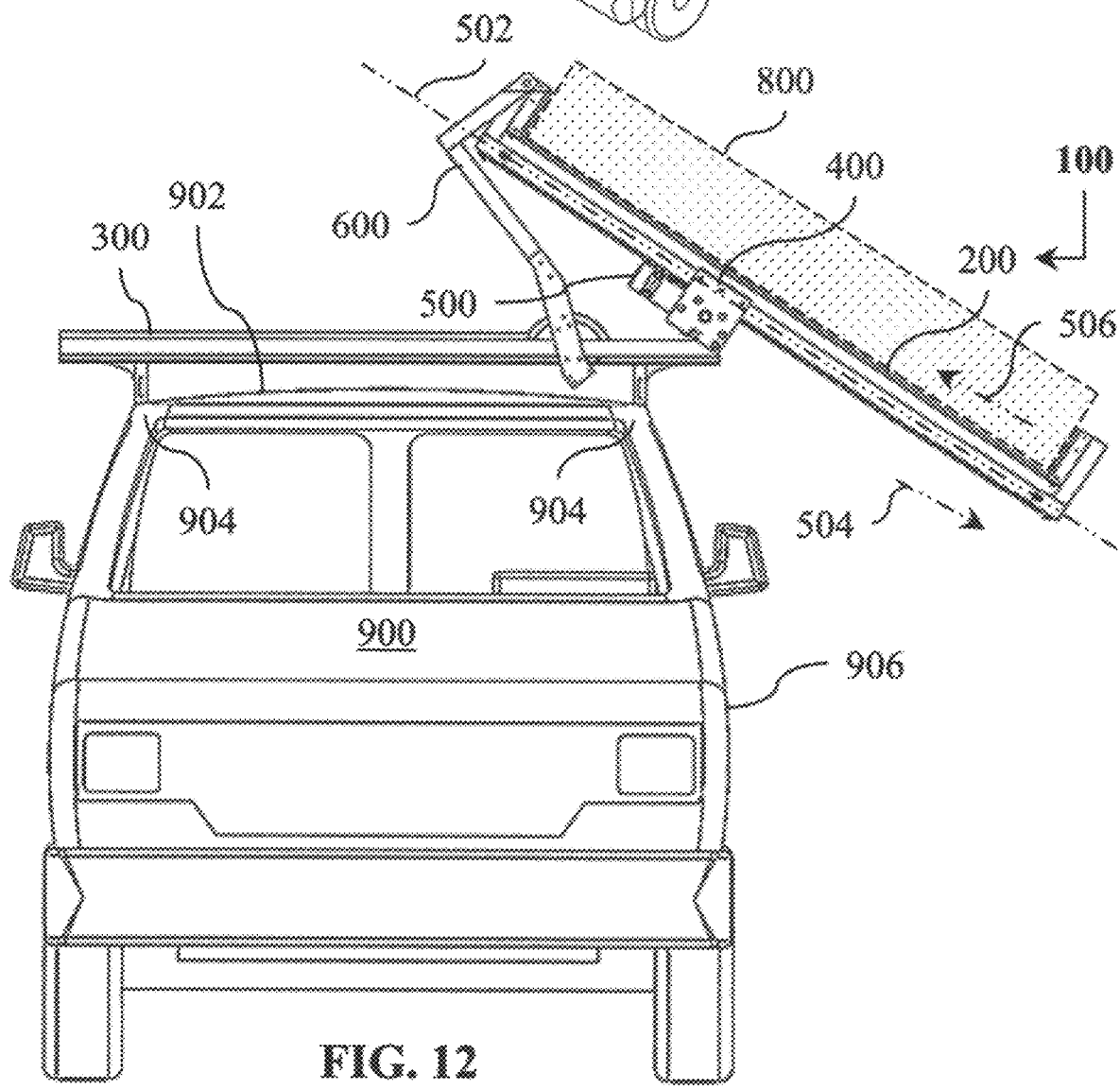

FIG. 11 and FIG. 12 (SHEET 6 of 12 SHEETS) depict a front perspective view (FIG. 11) and a front view (FIG. 12) of embodiments of the storage assembly 100 of FIG. 1.

Referring to the embodiments depicted in FIG. 11 and FIG. 12, the movable assembly 200 is moved (selectively moved) relative to the base assembly 300 from the tippable position (as depicted in FIG. 7) toward a tipped position or tipping position (as depicted in FIG. 12). In FIG. 7, if the movable assembly 200 is laterally moved further to the right side of the drawing sheet, the movable assembly 200 may begin to tip (rotate). In FIG. 12, the movable assembly 200 has been moved further to the right side of the drawing sheet, where the movable assembly 200 has tipped. In the tipping position, the movable assembly 200 has been tipped (rotated) to a certain extent. A length or portion of the movable assembly 200 extends beyond the vertical lateral side section 906 of the vehicle 900.

Figure 13:
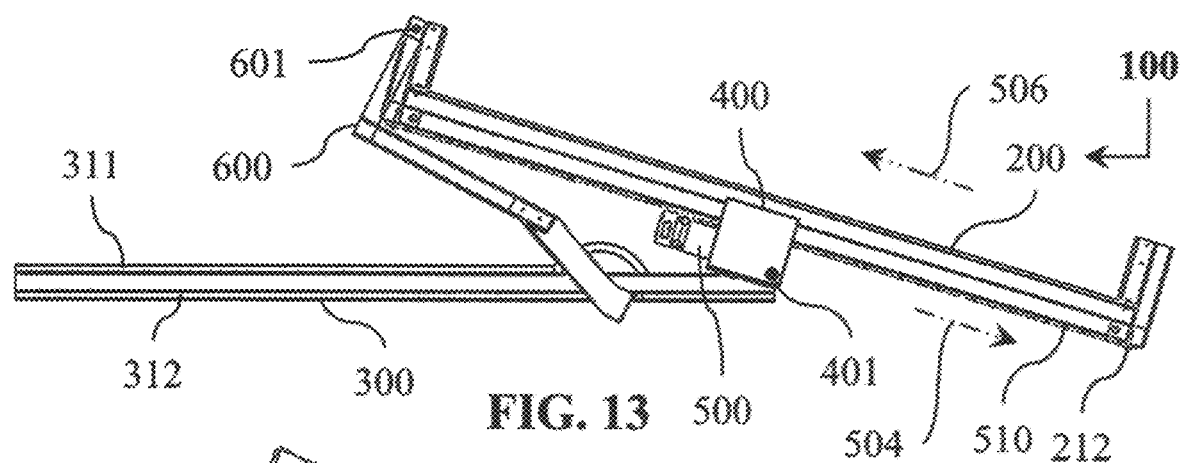
FIG. 13 and FIG. 14 depict side views (FIG. 13 and FIG. 14) of the embodiments of the storage assembly of FIG. 11.
Figure 14:
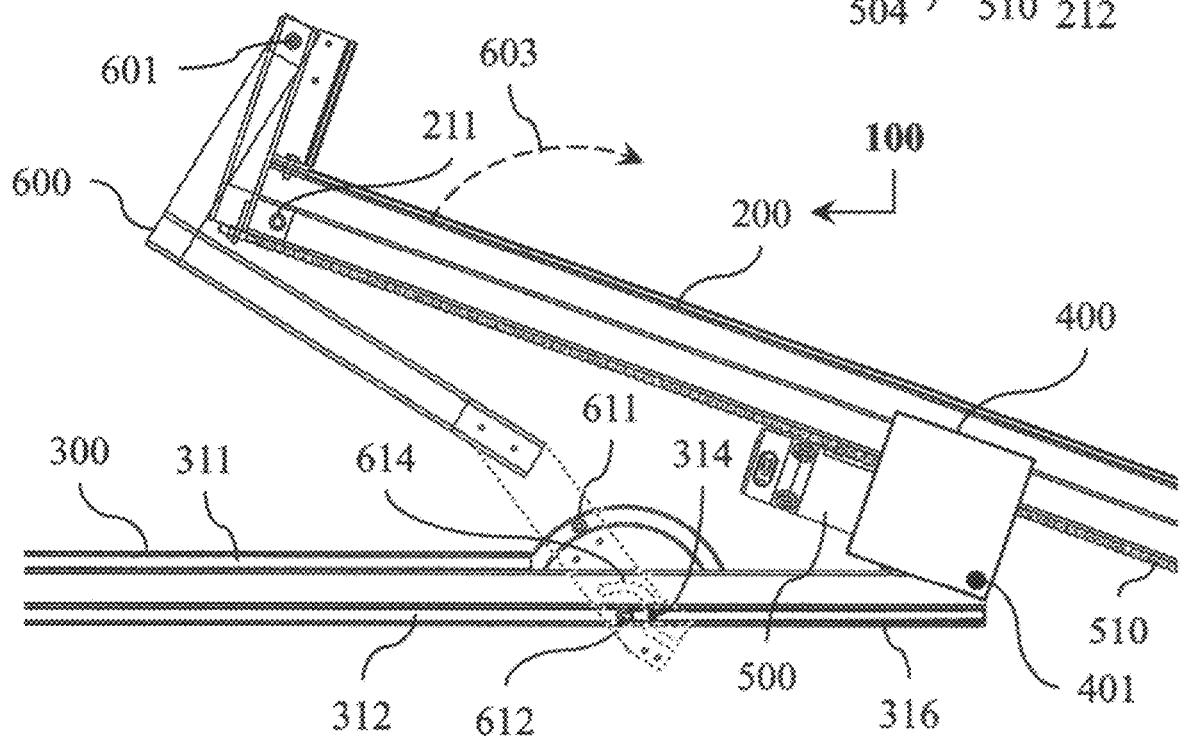

FIG. 13 and FIG. 14 (SHEET 7 of 12 SHEETS) depict side views (FIG. 13 and FIG. 14) of the embodiments of the storage assembly 100 of FIG. 11.

Referring to the embodiments depicted in FIG. 13 and FIG. 14, the movable assembly 200 is placed in the tipped position. There is provided a closer view of the components of the storage assembly 100.

Figure 15A:
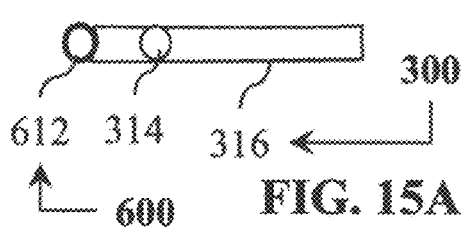
FIG. 15A and FIG. 15B depict a side view (FIG. 15A) and a top view (FIG. 15B) of embodiments of a base assembly of the storage assembly of FIG. 14.
Figure 15B:
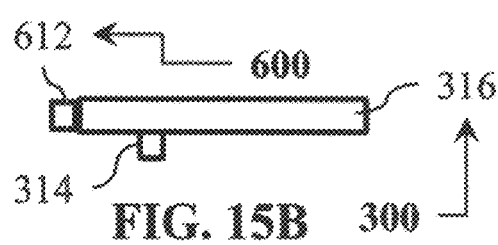

FIG. 15A and FIG. 15B (SHEET 7 of 12 SHEETS) depict a side view (FIG. 15A) and a top view (FIG. 15B) of embodiments of a base assembly 300 of the storage assembly 100 of FIG. 14.

Referring to the embodiments depicted in FIG. 15A and FIG. 15B, various components of the base assembly 300 are depicted, and described in greater detail below.

Figure 15C:
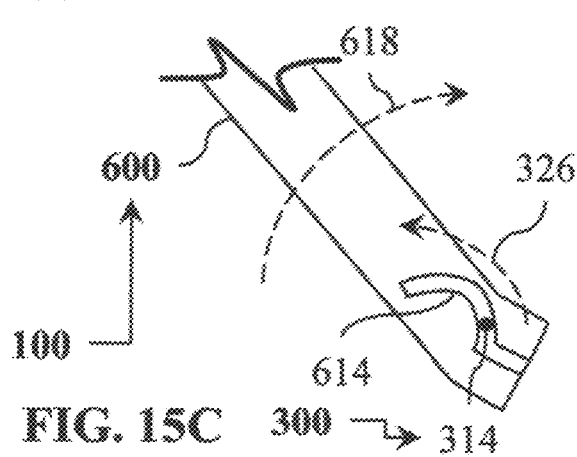
FIG. 15C depicts a side view (FIG. 15C) of an embodiment of a linkage assembly of the storage assembly of FIG. 14.

FIG. 15C (SHEET 7 of 12 SHEETS) depicts a side view (FIG. 15C) of an embodiment of a linkage assembly 600 of the storage assembly 100 of FIG. 14.

Referring to the embodiments depicted in FIG. 15C, various components of the linkage assembly 600 are depicted, and described in greater detail below.

Figure 16:
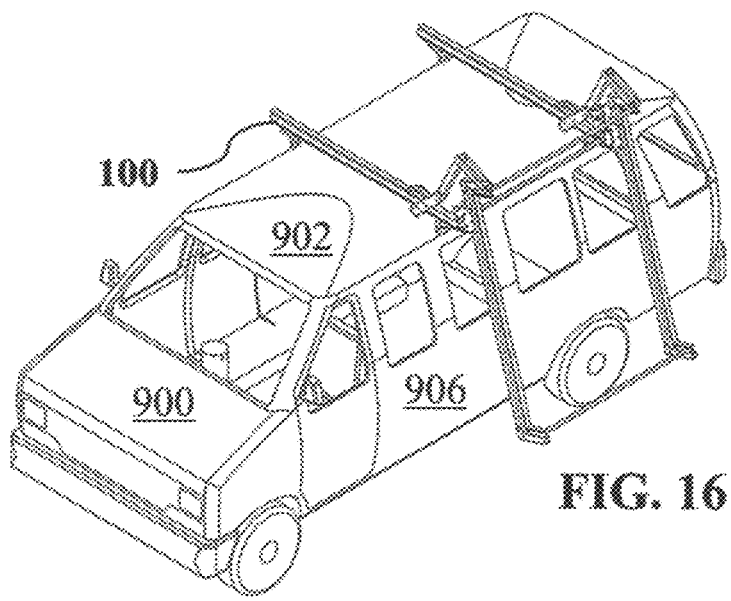
FIG. 16 and FIG. 17 depict a front perspective view (FIG. 16) and a front view (FIG. 17) of embodiments of the storage assembly of FIG. 1.

FIG. 16 and FIG. 17 (SHEET 8 of 12 SHEETS) depict a front perspective view (FIG. 16) and a front view (FIG. 17) of embodiments of the storage assembly 100 of FIG. 1.

Referring to the embodiments depicted in FIG. 16 and FIG. 17, the movable assembly 200 (with the load 800) is selectively movable between the tipped position (as depicted in FIG. 12) and the loading position disposed proximate to (near) a vertical lateral side section 906 of a vehicle 900 (as depicted in FIG. 17). The loading position (unloading position) is where the load 800 is placed onto the movable assembly 200 or is removed from the movable assembly 200, etc.

Figure 18:
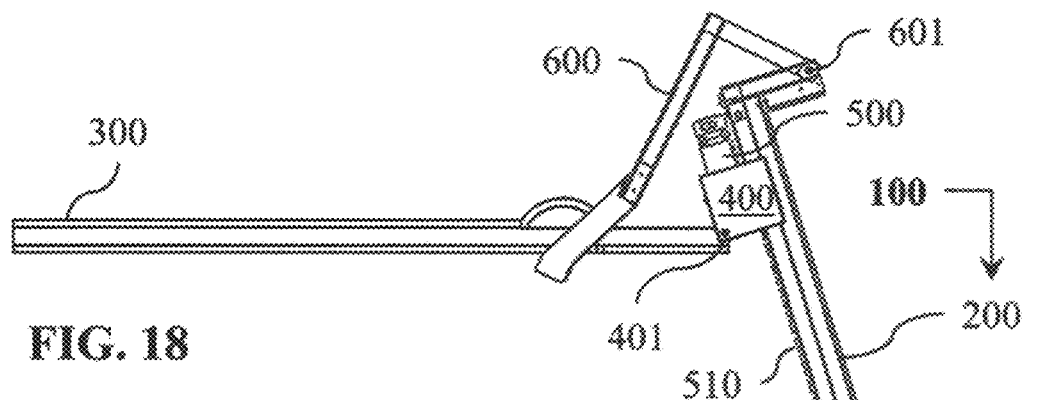
FIG. 18 and FIG. 19 depict side views (FIG. 18 and FIG. 19) of embodiments of the storage assembly of FIG. 16.
Figure 19:
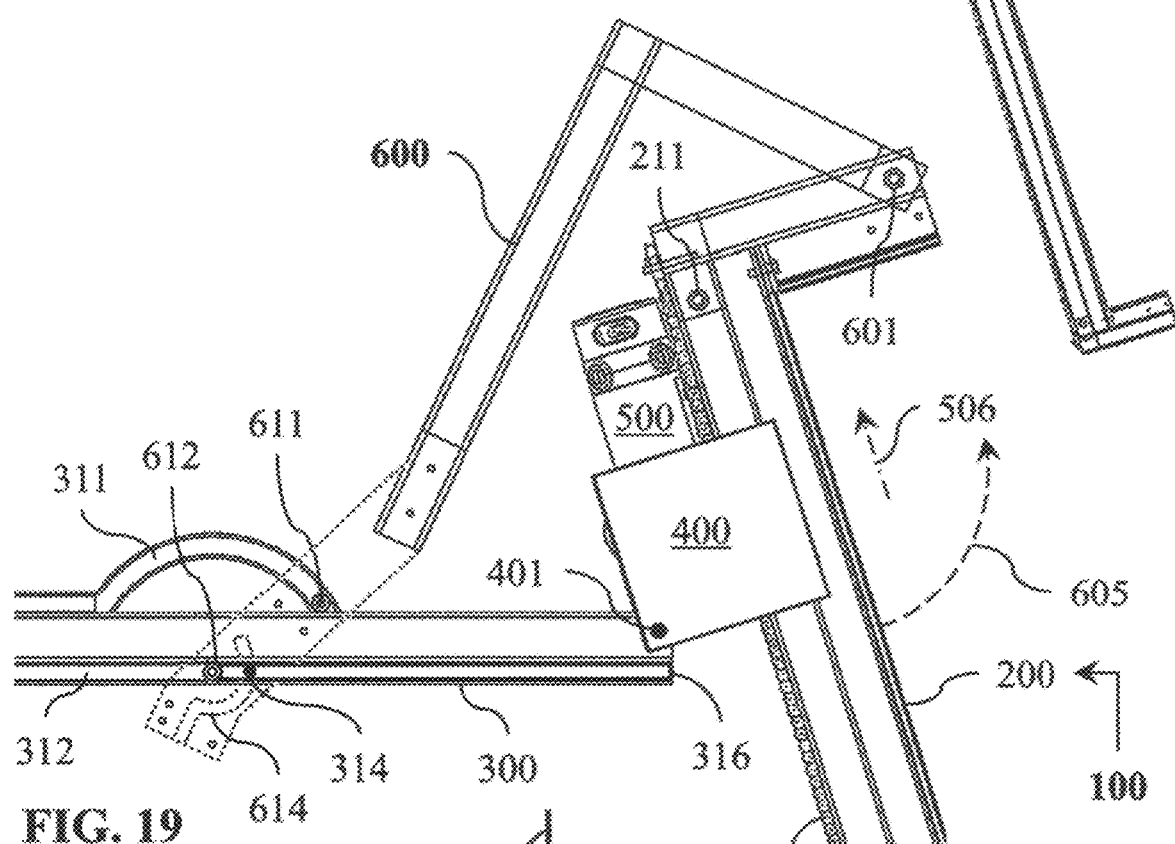

FIG. 18 and FIG. 19 (SHEET 9 of 12 SHEETS) depict side views (FIG. 18 and FIG. 19) of embodiments of the storage assembly 100 of FIG. 16.

Referring to the embodiments depicted in FIG. 18 and FIG. 19, the movable assembly 200 is placed in the loading position. There is provided a closer view of the components of the storage assembly 100.

Figure 20B:
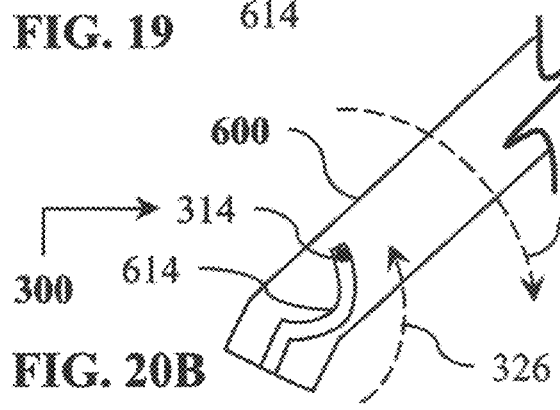
FIG. 20B depicts a side view of an embodiment of a linkage assembly of the storage assembly of FIG. 19.
Figure 20A:
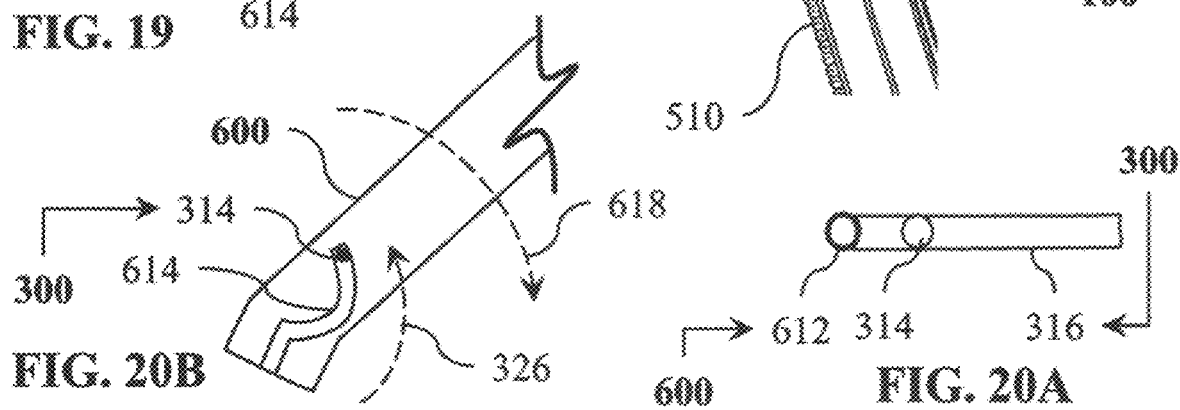
FIG. 20A depicts a side view of an embodiment of a base assembly of the storage assembly of FIG. 19.

FIG. 20A (SHEET 9 of 12 SHEETS) depicts a side view of an embodiment of a base assembly 300 of the storage assembly 100 of FIG. 19.

Referring to the embodiment depicted in FIG. 20A, various components of the base assembly 300 are depicted and described in greater detail below.

FIG. 20B (SHEET 9 of 12 SHEETS) depicts a side view of an embodiment of a linkage assembly 600 of the storage assembly 100 of FIG. 19.

Referring to the embodiment depicted in FIG. 20B, various components of the linkage assembly 600 are depicted and described in greater detail below.

Figure 21:
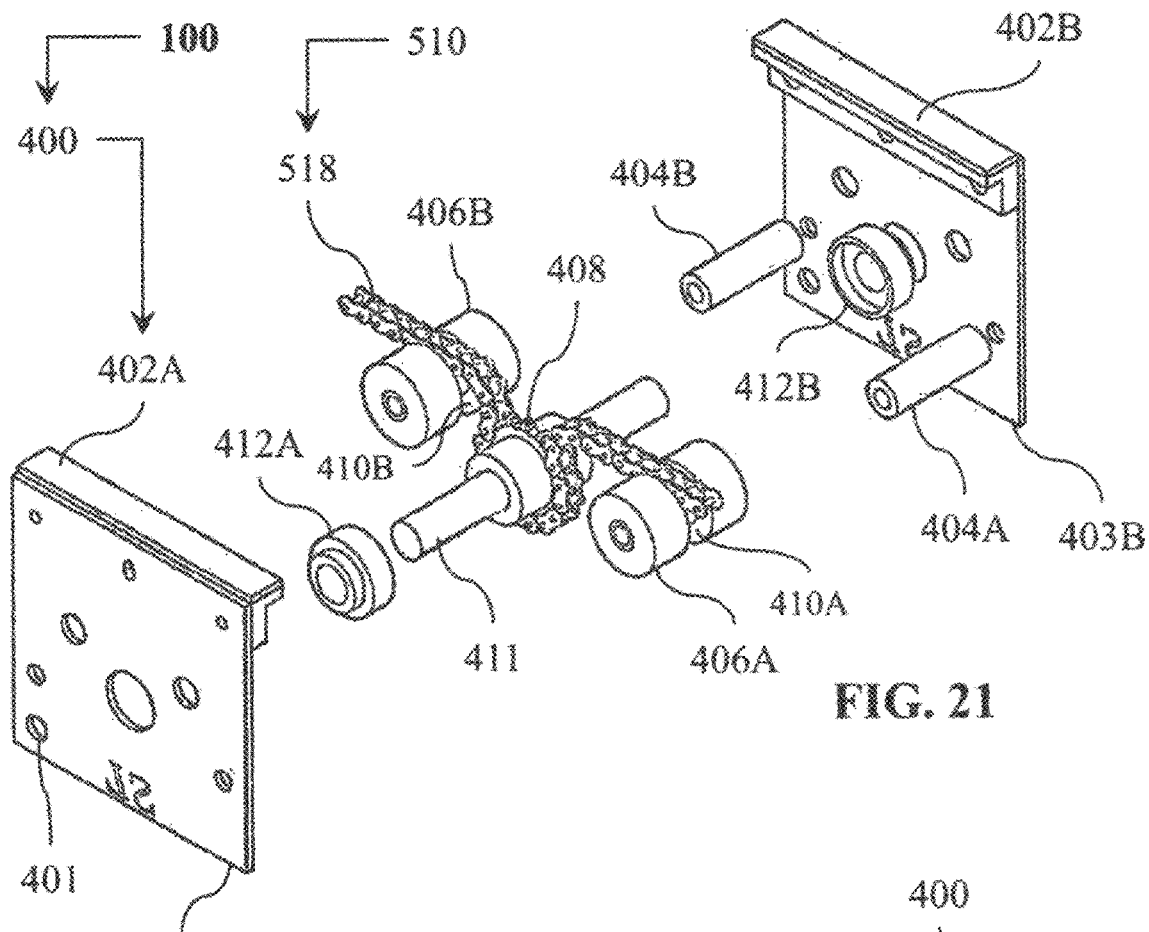
FIG. 21 and FIG. 22 depict an exploded front perspective view (FIG. 21) and a front perspective view (FIG. 22) of embodiments of a coupler assembly of the storage assembly of FIG. 1.
Figure 22:
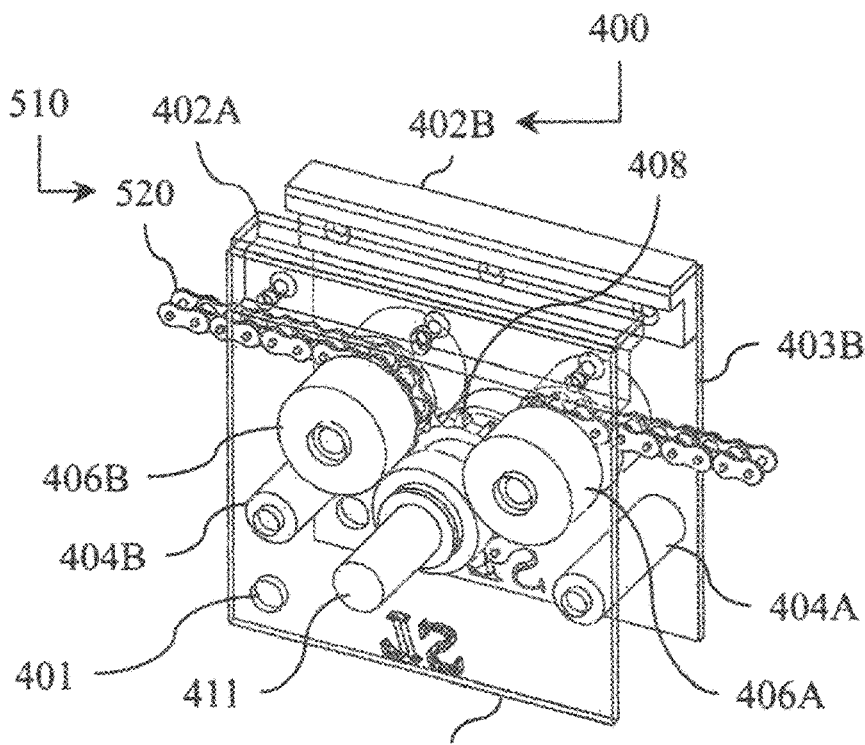

FIG. 21 and FIG. 22 (SHEET 10 of 12 SHEETS) depict an exploded front perspective view (FIG. 21) and a front perspective view (FIG. 22) of embodiments of a coupler assembly 400 of the storage assembly 100 of FIG. 1.

Referring to the embodiments depicted in FIG. 21 and FIG. 22, a coupler assembly 400 is configured to be rotatably mounted (pivotally mounted or connected) to the base assembly 300. The coupler assembly 400 is also configured to be slidably mounted to the movable assembly 200. The coupler assembly 400 is configured to permit rotation (tipping) of the movable assembly 200 relative to the base assembly 300 when the movable assembly 200 is moved between the tippable position (as indicated in FIG. 7) and the loading position (as depicted in FIG. 17). The first roller guide 406A and the second roller guide 406B define the first drive guide 410A and the second drive guide 410B, respectively. The first drive guide 410A and the second drive guide 410B are configured to retain and guide relative movement between the flexible elongated drive member 510 and the coupler assembly 400.

FIG. 23 and FIG. 24 (SHEET 11 of 12 SHEETS) depict a front perspective view (FIG. 23) and a front view (FIG. 24) of embodiments of a coupler assembly 400 of the storage assembly 100 of FIG. 1.

Referring to the embodiments depicted in FIG. 23 and FIG. 24, an alternative embodiment of the coupler assembly 400 is provided.

FIG. 25 (SHEET 11 of 12 SHEETS) depicts a schematic view (FIG. 25) of an embodiment of a control circuit 700 of the storage assembly 100 of FIG. 1.

Referring to the embodiment depicted in FIG. 25, the control circuit 700 is configured to control the movements of the movable assembly 200 and is described with further details below.

FIG. 26 (SHEET 12 of 12 SHEETS) depicts a top schematic view of an embodiment of an actuator assembly 500 of the storage assembly 100 of FIG. 1.

Referring to the embodiment depicted in FIG. 26, the actuator assembly 500 is configured to selectively actuate movements of the movable assembly 200 and is described with further details below.

Referring to the embodiments depicted in FIG. 1, FIG. 2, FIG. 12, and FIG. 17, an apparatus is for use with a load 800 and is also for use with a vehicle 900. The vehicle 900 has a vertical lateral side section 906 and a vehicle roof 902 with load-bearing portions 904. The apparatus includes a storage assembly 100. The storage assembly 100 includes a movable assembly 200 configured to receive and support the weight of the load 800 (as depicted in FIG. 2 and FIG. 17). The storage assembly 100 includes a base assembly 300 configured to be fixedly mounted to the load-bearing portions 904 of the vehicle roof 902 of the vehicle 900. The base assembly 300 is also configured to support the movement of the movable assembly 200 with the load 800 between a load-storage position (as depicted in FIG. 2) and a load-access position (as depicted in FIG. 17). This movement is done when the base assembly 300, in use, is fixedly mounted to the load-bearing portions 904 of the vehicle roof 902, and the movable assembly 200, in use, receives and supports the weight of the load 800. A technical advantage for the apparatus is that the load 800 can be safely removed from the vehicle 900 by reducing inadvertent shifting of the weight of the load 800 when using the components of the storage assembly 100, thereby reducing the possibility of user injury.

Referring to the embodiments as depicted in FIG. 2 and FIG. 17, the load-storage position (as depicted in FIG. 2) is disposed proximate to and over the vehicle roof 902. The movable assembly 200 is alignable in a first orientation (a horizontal orientation) so that the load 800, in use, is transportable by the vehicle 900. In the load-storage position (as depicted in FIG. 2), the movable assembly 200 is positioned over the vehicle roof 902 and is oriented in the first orientation. The load-access position (as depicted in FIG. 17) is disposed proximate to the vertical lateral side section 906 of the vehicle 900. The movable assembly 200 is alignable in a second orientation (a non-horizontal orientation) so that the load 800 may be removed from or loaded onto the movable assembly 200. In the load-access position (as depicted in FIG. 17), the movable assembly 200 is positioned at the vertical lateral side section 906 of the vehicle 900 and is oriented in the non-horizontal orientation. An advantage provided by the load-storage position is that the load 800 can be safely stored over the vehicle 900 by reducing inadvertent shifting of the weight of the load 800, thereby reducing the possibility of user injury. An advantage of the load-access position is that the load 800 can be safely removed by reducing inadvertent shifting of the weight of the load 800, thereby reducing the possibility of user injury.

Referring to the embodiments as depicted in FIG. 3, FIG. 12, and FIG. 13, there is provided a linkage assembly 600 configured to be pivotally connected (via a linkage pivot 601) to the movable assembly 200. The linkage assembly 600 is also configured to be pivotally linked via a first pin 611 and a second pin 612 to a first elongated track 311 and a second elongated track 312 (respectively) of the base assembly 300. The linkage assembly 600 advantageously provides desirable directional movements for the movable assembly 200, reducing the possibility of inadvertent user injury. In accordance with a preferred embodiment, the linkage assembly 600 advantageously facilitates a combination of linear translation and pivotal translation. It is preferred that the linkage assembly 600 is configured to facilitate pivotal movement (translation) when a majority of the movable assembly 200 reaches past the vertical lateral side section 906 of the vehicle 900, and this action assists in providing improved efficient travel down the side (the vertical lateral side section 906) of the vehicle 900 (as depicted in FIG. 12 and FIG. 13). The linkage assembly 600 advantageously provides the combined movement of linear translation and pivotal tipping and takes advantage of the weight of the movable assembly 200 (with the load 800 when unloading) that extends past the vertical lateral side section 906 to facilitate efficient pivotal movement of the movable assembly 200. The center of gravity of the combination of the movable assembly 200 (with the load 800 when unloading) is moved (with guiding assistance from the linkage assembly 600) past the vertical lateral side section 906, and then the movable assembly 200 may be pivotally translated. The linkage assembly 600 (also called a pivot arm) is pinned high on the movable assembly 200 to steady the movable assembly 200 when placed at the side of the vehicle 900. This arrangement may allow maximum travel while providing a strong brace against the moment (rotational force) created when the load is placed on the movable assembly 200.

Referring to the embodiments depicted in FIG. 3, the base assembly 300 includes a base stop 316 configured to selectively abut against the second pin 612 of the linkage assembly 600. The second connection terminal 212 is configured to attach one end of the flexible elongated drive member 510 to a bottom portion of the movable assembly 200 (proximate to the outboard end section 304).

Referring to the embodiments depicted in FIG. 4, the first connection terminal 211 is configured to attach one end of the flexible elongated drive member 510 to a bottom portion of the movable assembly 200 (proximate to the inboard end section 302).

Referring to the embodiments as depicted in FIG. 2, FIG. 13, and FIG. 19, the linkage assembly 600 is also configured to facilitate linear movement of the movable assembly 200 horizontally along the outboard movement direction 504. Linear movement extends from the load-storage position (as depicted in FIG. 2, disposed above the vehicle roof 902) toward a tippable position (as depicted in FIG. 7). After the position as depicted in FIG. 7, the movable assembly 200 is rotated without inadvertently imparting damage to the vehicle 900. The linkage assembly 600 advantageously facilitates linear movement of the movable assembly 200 and/or reduces the possibility of inadvertent vehicle damage.

Referring to the embodiments as depicted in FIG. 2, FIG. 12, FIG. 13, and FIG. 19, the linkage assembly 600 is also configured to facilitate rotational movement of the movable assembly 200 along a rotation movement direction 603 (as depicted in FIG. 7) from the tippable position (as depicted in FIG. 7) toward the non-horizontal orientation (as depicted in FIG. 17). In the non-horizontal orientation, the movable assembly 200 is positionable proximate to the vertical lateral side section 906 of the vehicle 900 so that the load 800 can be removed from, or loaded onto, the movable assembly 200 when the movable assembly 200 is positioned at the non-horizontal orientation. The linkage assembly 600 advantageously facilitates rotational movement of the movable assembly 200 and reduces the possibility of inadvertent vehicle damage.

Referring to the embodiments as depicted in FIG. 2, FIG. 3, FIG. 17, FIG. 19, the linkage assembly 600 is also configured to facilitate rotational movement of the movable assembly 200 along a counter-rotation movement direction 605 (as depicted in FIG. 19), from the non-horizontal orientation (as depicted in FIG. 17), disposed proximate to the vertical lateral side section 906 of the vehicle 900, toward the tippable position (as depicted in FIG. 7). In the tippable position, the movable assembly 200 is positionable in horizontal alignment relative to the vehicle roof 902. The linkage assembly 600 advantageously permits rotational movement of the movable assembly 200, reducing the possibility of inadvertent vehicle damage.

Referring to the embodiments as depicted in FIG. 2, FIG. 3, FIG. 17, FIG. 19, the linkage assembly 600 is also configured to facilitate linear movement of the movable assembly 200 horizontally along the inboard movement direction 506, away from the tippable position (as depicted in FIG. 7) and toward the load-storage position (as depicted in FIG. 2) disposed above the vehicle roof 902. The linkage assembly 600 advantageously permits further linear movement of the movable assembly 200, reducing the possibility of inadvertent vehicle damage.

Referring to the embodiments depicted in FIG. 2, FIG. 3, FIG. 17, FIG. 19, the base assembly 300 includes an inboard end section 302 disposed distally from the vertical lateral side section 906 of the vehicle 900. The base assembly 300 includes an outboard end section 304 spaced apart from the inboard end section 302. The outboard end section 304 is disposed proximate to the vertical lateral side section 906 of the vehicle 900. A base pivot 314 is fixedly positioned proximate to the outboard end section 304. The base pivot 314 is configured to interact with the linkage assembly 600. The base assembly 300 (with the base pivot 314) advantageously provides a relatively stationary reference for the pivotal movement action of the linkage assembly 600, while the linkage assembly 600 facilitates controlled movement of the movable assembly 200.

Referring to the embodiments as depicted in FIG. 3, FIG. 4, and FIG. 5, a first elongated track 311 extends between (spans) the inboard end section 302 and the outboard end section 304. The first elongated track 311 is configured to interact with the linkage assembly 600. A second elongated track 312 extends between (spans) the inboard end section 302 and the outboard end section 304. The second elongated track 312 is configured to interact with the linkage assembly 600. The first elongated track 311 and the second elongated track 312 are spaced apart from each other. The first elongated track 311 and the second elongated track 312 are alignable, at least in part, to be parallel (relative to each other). The base assembly 300 advantageously provides an additional degree of relative stationary reference for further pivotal movement action of the linkage assembly 600 while the linkage assembly 600 facilitates controlled movement of the movable assembly 200.

Referring to the embodiments depicted in FIG. 3, FIG. 4, and FIG. 5, the first elongated track 311 includes a curved track section 328 positioned proximate to the outboard end section 304. The curved track section 328 is configured to arch toward the movable assembly 200. The first elongated track 311 also includes a first elongated track section 331 (linear track section) configured to extend between the inboard end section 302 and the curved track section 328, with the curved track section 328 positioned proximate to the outboard end section 304. The curved track section 328 and the first elongated track section 331 of the first elongated track 311 advantageously facilitate (with cooperation from the first pin 611 of the linkage assembly 600) improved controlled rotation of the movable assembly 200.

Referring to the embodiments depicted in FIG. 3, FIG. 4, and FIG. 5, the second elongated track 312 includes a second elongated track section 332 extending from the inboard end section 302. The second elongated track section 332 extends and passes by the curved track section 328 toward the outboard end section 304. The second elongated track section 332 of the second elongated track 312 advantageously facilitates (with cooperation from the second pin 612 of the linkage assembly 600) improved controlled linear translation of the movable assembly 200.

Referring to the embodiments depicted in FIG. 3, FIG. 4, and FIG. 5, the linkage assembly 600 includes a first pin 611 configured to be slidably movable along the first elongated track 311 of the base assembly 300. A second pin 612 is configured to be slidably movable, at least in part, along the second elongated track 312 of the base assembly 300. A curved cam surface 614 is configured to slidably interact with the base pivot 314 of the base assembly 300. The linkage assembly 600 advantageously provides three stable points of reference with the base assembly, thereby improving the stability of movement action of the linkage assembly 600 while the linkage assembly 600 facilitates controlled movement of the movable assembly 200. Although FIG. 3, FIG. 4, and FIG. 5 depict the curved cam surface 614 as disposed interior to the storage assembly 100, it is to be appreciated that, in an embodiment, the curved cam surface 614 is disposed externally to the storage assembly 100, e.g., disposed in front of the linkage assembly 600 in FIG. 4 as though represented by non-dotted lines in FIG. 4.

Referring to the embodiments depicted in FIG. 7 and FIG. 10, the linkage assembly 600 includes a straight cam surface 615 (a linear cam portion) leading into a curved cam surface 614. The straight cam surface 615 is configured to linearly slidably interact with the base pivot 314 of the base assembly 300, and the linkage assembly 600 together with the movable assembly 200 are linearly movable. The curved cam surface 614 (cam curved portion) is configured to rotatably slidably interact with the base pivot 314 of the base assembly 300, thereby permitting the linkage assembly 600 (together with the movable assembly 200) to be rotatable. When the base pivot 314 is positioned where the straight cam surface 615 and the curved cam surface 614 intersect with each other (meet), the tippable position (as depicted in FIG. 7 and FIG. 10) is reached for the movable assembly 200. Further movement past the tippable position (as depicted in FIG. 7), causes rotation of the movable assembly 200 (preferably without inadvertently damaging the vehicle 900). The curved cam surface 614 and the straight cam surface 615 advantageously facilitate consistent (repeatable) positioning of the movable assembly 200 for rotation motion.

Referring to the embodiments depicted in FIG. 3, a coupler assembly 400 is configured to be pivotally mounted (via the coupler pivot 401) to an outboard end section 304 of the base assembly 300. The outboard end section 304 is disposed proximate to the vertical lateral side section 906 of the vehicle 900 when (after) the base assembly 300, in use, is fixedly mounted to the load-bearing portions 904 of the vehicle roof 902. The coupler assembly 400 advantageously facilitates cooperative rotational movement of the movable assembly 200 (in synergistic cooperation with the linkage assembly 600) relative to the base assembly 300. The base assembly 300 is relatively stationary when (after) the base assembly 300 is mounted to the load-bearing portions 904 of the vehicle roof 902.

Referring to the embodiments depicted in FIG. 3, FIG. 8, FIG. 13, and FIG. 18, the coupler assembly 400 is also configured to be slide coupled to the movable assembly 200. This coupling is done in such a way that the coupler assembly 400 facilitates (permits) sliding (reciprocal) movement of a length of the movable assembly 200 along an inboard movement direction 506 extending between a first lateral end section 201 and a second lateral end section 202 (as depicted in FIG. 8) of the movable assembly 200. The coupler assembly 400 advantageously facilitates cooperative rotational movement and linear movement of the movable assembly 200, in synergistic cooperation with the linkage assembly 600, relative to the base assembly 300 that is relatively stationary when the base assembly 300 is mounted to the load-bearing portions 904 of the vehicle roof 902.

Referring to the embodiments as depicted in FIG. 8, an actuator assembly 500 is configured to be fixedly mounted to the coupler assembly 400. The actuator assembly 500 is also configured to be drive coupled to the movable assembly 200. The actuator assembly 500 is also configured to selectively urge movement of the movable assembly 200 (relative to the coupler assembly 400) along an inboard movement direction 506 extending between a first lateral end section 201 (as depicted in FIG. 8) and a second lateral end section 202 (as depicted in FIG. 8) of the movable assembly 200. The actuator assembly 500 advantageously facilitates the controlled movement of the movable assembly 200.

Referring to the embodiments as depicted in FIG. 8, the actuator assembly 500 is also configured to move the movable assembly 200 along: (A) an outboard movement direction 504 aligned (extended) from the first lateral end section 201 toward the second lateral end section 202 of the movable assembly 200; or (B) an inboard movement direction 506 aligned (extended) from the second lateral end section 202 toward the first lateral end section 201 of the movable assembly 200. The actuator assembly 500 advantageously facilitates movement of the movable assembly 200 with the load 800 without further direct hand-on manipulation from the user of the apparatus.

Referring to the embodiments as depicted in FIG. 8, a flexible elongated drive member 510 is provided. The flexible elongated drive member 510 may include an elongated chain assembly 518 (as depicted in FIG. 21) or an elongated belt assembly 520 (as depicted in FIG. 23). As shown at FIGS. 28A and 28B, the flexible elongated drive member 510 may include a rack and pinion drive 2800. The rack and pinion drive 2800 includes a rack or linear gear 2802 for interfacing at slots 2804 with teeth 2806 of a pinion or circular gear 2808. The rack 2802 and pinion 2808 may be implemented as one or more sprockets interfacing with one or more belts. The movable assembly 200 is configured to be affixed to the flexible elongated drive member 510. The actuator assembly 500 is also configured to be coupled to the flexible elongated drive member 510. The actuator assembly 500 is also configured to move the flexible elongated drive member 510 to move the movable assembly 200. The flexible elongated drive member 510 advantageously prevents the direct connection between the movable assembly 200 with the load 800 and the actuator assembly 500. For the case where the combined weight of the movable assembly 200 with the load 800 is too great, the flexible elongated drive member 510 may decouple from the actuator assembly 500, thereby avoiding inadvertent damage to the actuator assembly 500.

Referring to the embodiments depicted in FIG. 8, the movable assembly 200 includes a first connection terminal 211 configured to be affixed to a first end of the flexible elongated drive member 510. A second connection terminal 212 is configured to be affixed to a second end of the flexible elongated drive member 510. The movable assembly 200 advantageously provides connection points, thereby simplifying the design.

Referring to the embodiments as depicted in FIG. 5A (side view), FIG. 5B (top view), and FIG. 5C (partial side view), the second pin 612 is spaced apart from the base pivot 314 when the movable assembly 200 is positioned in the storage position (as depicted in FIG. 2). The base pivot 314 is affixed to the base stop 316. The base pivot 314 extends laterally from the base stop 316. The linkage assembly 600 includes a straight cam surface 615 leading into a curved cam surface 614. The base pivot 314 is configured to be initially received in the straight cam surface 615 when the linkage assembly 600 is moved along the linear movement direction 616. Further movement of the linkage assembly 600 along the linear movement direction 616 results in the base pivot 314 abutting the curved cam surface 614. In response, the linkage assembly 600 may tip (rotate) when the base pivot 314 moves along (within) the curved cam surface 614, and the linkage assembly 600 may then tip (rotate).

Referring to the embodiment as depicted in FIG. 5D and FIG. 3, the base stop 316 includes a stop surface 317. The base stop 316 includes a connector hole 318. A connector (not depicted) affixes the base stop 316 to the base assembly 300 (within the second elongated track 312, at the outboard end section 304, as depicted in FIG. 3). The second elongated track 312 includes at least one wear-resistant surface 320 configured to interact with the second pin 612 of the linkage assembly 600. The second pin 612 is configured to be movable along the linear movement direction 322. The second pin 612 is configured to be rotatable along a rotational movement direction 324. The pin shaft 612A extends from the lateral side of the second pin 612.

Referring to the embodiment depicted in FIG. 5E, the coupler assembly 400 includes spaced-apart slide engagement devices (402A, 402B) or slide guides. The movable assembly 200 includes an elongated tubular member 214, having a flat top surface 216, a flat side surface 218, and a flat bottom surface 220. A beam member 222 is affixed to and extends from the flat top surface 216. Between the top section of the beam member 222 and the flat top surface 216, an elongated sidetrack 224 (groove) is defined. The movable assembly 200 is configured to slide along a linear movement direction 226. A first roller guide 406A is mounted to the coupler assembly 400. The first roller guide 406A is configured to guide the movement of the flexible elongated drive member 510. A first drive guide 410A is formed in the roller guide 406A (also depicted in FIG. 21 and FIG. 22). The first drive guide 410A is configured to guide the movement of the flexible elongated drive member 510 (depicted in FIG. 4).

Referring to the embodiment depicted in FIG. 10A (side view) and FIG. 10B (top view), in the tippable position, the second pin 612 makes contact with the base stop 316 (the stop surface 317 of the base stop 316).

Referring to the embodiment depicted in FIG. 10C (partial side view), the base pivot 314 is received into the straight cam surface 615 and reaches the point where the straight cam surface 615 merges or leads into the curved cam surface 614. The linkage assembly 600 is ready for tipping along the rotational movement direction 618.

Referring to the embodiment depicted in FIG. 15A (side view) and FIG. 15B (top view), in the tipping position, the second pin 612 continues to contact the base stop 316 (the stop surface 317 of the base stop 316).

Referring to the embodiment depicted in FIG. 15C (partial side view), the base pivot 314 travels from the straight cam surface 615 and into (along) the curved cam surface 614, past where the straight cam surface 615 merges or leads into the curved cam surface 614. The linkage assembly 600 continues to tip or rotate along the rotational movement direction 618.

Referring to the embodiment depicted in FIG. 20A (side view), in the storage position, the second pin 612 continues to contact the base stop 316 (the stop surface 317 of the base stop 316).

Referring to the embodiment depicted in FIG. 20B (partial side view), in the storage position, the base pivot 314 continues to travel along the pin movement direction 326. The base pivot 314 reaches the extent of travel into the curved cam surface 614. The linkage assembly 600 stops tipping or rotating along the rotational movement direction 618. It will be appreciated that the process is reversible back from FIG. 20B to FIG. 5A.

Referring to the embodiments depicted in FIG. 21 and FIG. 22, the flexible elongated drive member 510 includes an elongated chain assembly 518 (and any equivalent thereof, such as rack and pinion or sprocket and belt approaches previously discussed with reference to FIGS. 28A and 28B) having links coupled one after another. The coupler assembly 400 includes plates (403A, 403B) spaced apart from each other. Slide engagement devices (402A, 402B) are configured to slidably engage with (an elongated length of) the movable assembly 200. Spacers (404A, 404B) are configured to be positioned between the plates (403A, 403B). The spacers (404A, 404B) are also configured to maintain the plates (403A, 403B) in a spaced-apart relationship with each other. Roller guides (406A, 406B) are configured to guide the movement of the flexible elongated drive member 510. A sprocket 408 is configured to engage with the elongated chain assembly 518. A rotatable axle 411 is configured to span across the plates (403A, 403B). The rotatable axle 411 is also configured to support the sprocket 408. Bearings (412A, 412B) are configured to be mounted to the plates (403A, 403B). The bearings (412A, 412B) are also configured to support the rotatable axle 411. It will be appreciated that equivalents of the elongated chain assembly 518 may include a timing belt, a lead screw (not depicted), a hydraulic motor (not depicted), a pinion (FIGS. 28A, 28B), a belt for interfacing with a sprocket (not depicted), etc.

Referring to the embodiments depicted in FIG. 23 and FIG. 24, the flexible elongated drive member 510 includes an elongated belt assembly 520. The coupler assembly 400 includes the plates (403A, 403B) spaced apart from each other. The slide engagement devices (402A, 402B) are configured to slidably engage with the movable assembly 200. The spacers (404A, 404B) are configured to be positioned between the plates (403A, 403B). The spacers (404A, 404B) are also configured to maintain the plates (403A, 403B) in a spaced-apart relationship with each other. The guides (406A, 406B) are configured to guide the movement of the flexible elongated drive member 510. The rotatable axle 411 is configured to span across the spaced-apart plates (403A, 403B). The rotatable axle 411 is also configured to frictionally contact the elongated belt assembly 520. The bearings (412A, 412B) are configured to be mounted to the plates (403A, 403B). The bearings (412A, 412B) are also configured to support the rotatable axle 411.

Referring to the embodiment depicted in FIG. 25, a control circuit 700 is configured to interface with (and control actuation of) the actuator assembly 500. A sensor assembly 702 (such as a proximity sensor, etc.) is configured to be positioned proximate to the movable assembly 200. The sensor assembly 702 is also configured to determine the position of the movable assembly 200. A control switch 704 (up/down control) is configured to interface with (and control) the actuator assembly 500. This interfacing is done in such a way that the actuator assembly 500, in use, controls the direction of movement of the movable assembly 200.

Referring to the embodiment depicted in FIG. 26, the movable assembly 200 includes at least two spaced-apart movable rails (203A, 203B). It will be appreciated that the movable assembly 200 may include any suitable number of spaced-apart movable rails (203A, 203B). The actuator assembly 500 is configured to selectively move the spaced-apart movable rails (203A, 203B) of the movable assembly 200, between the positions depicted in FIG. 2 (storage position) and FIG. 17 (loading position).

Referring to the embodiment depicted in FIG. 26 and FIG. 1, the actuator assembly 500 includes at least one motor 512, such as an electric motor. The motor 512 is affixed to (and supported by) the base assembly 300 (either directly or indirectly). In accordance with a preferred embodiment, the base assembly 300 includes spaced-apart base rails (303A, 303B): a first base rail 303A and a second base rail 303B, depicted in FIG. 1. The actuator assembly 500 is affixed to (and supported by) the base assembly 300 (either directly or indirectly). As depicted in FIG. 1, the actuator assembly 500 is affixed to the second base rail 303B.

Referring to the embodiment depicted in FIG. 26, the motor 512 may be powered by a vehicle battery (not depicted) installed to the vehicle 900 (depicted in FIG. 1) or to an auxiliary battery, which may receive charging from the vehicle 900 while the vehicle 900 is turned on, etc. The motor 512 includes a rotatable motor shaft 514 configured to rotate along a rotation direction 515.

Referring to the embodiment depicted in FIG. 26, the movable assembly 200 includes a first movable rail 203A and a second movable rail 203B spaced apart from the first movable rail 203A. The actuator assembly 500 is configured to selectively move the first movable rail 203A and the second movable rail 203B. The actuator assembly 500 includes a motor 512 affixed to (and supported by) the base assembly 300. The motor 512 includes a rotatable motor shaft 514 configured to rotate a gear-box assembly 521. The gear-box assembly 521 has an input shaft 523, a first output shaft 522A, and a second output shaft 522B. The input shaft 523 is coupled to the rotatable motor shaft 514 of the motor 512. The first output shaft 522A (of the gear-box assembly 521) is coupled to a first flexible elongated drive member 510A. The first flexible elongated drive member 510A is affixed to the first movable rail 203A at spaced-apart connection terminals (211A, 212A). The second output shaft 522B (of the gear-box assembly 521) is coupled to a second flexible elongated drive member 510B. The second flexible elongated drive member 510B is affixed to the second movable rail 203B at spaced-apart connection terminals (211B, 212B).

Referring to the embodiment depicted in FIG. 26, the actuator assembly 500 further includes at least one gear-box assembly 521. The gear-box assembly 521 has an input shaft 523 and a pair of output shafts (522A, 522B). The gear-box assembly 521 may include a right angle gear reducer (30:1 reduction), Model Number NWM-50B-30-56C (or any equivalent thereof) manufactured by SHIMPO-KUMA: NIDEC-SHIMPO America Corporation is the U.S. subsidiary of Japan-based NIDEC-SHIMPO Corporation. The input shaft 523 (of the gear-box assembly 521) is coupled (by a first coupler 516A) to the rotatable motor shaft 514 (of the motor 512).

Referring to the embodiment depicted in FIG. 26, the first output shaft 522A (of the gear-box assembly 521) is coupled (by a second coupler 516B) to a first drivable shaft 524A. The first drivable shaft 524A is coupled (by a third coupler 516C) to the first rotatable axle 411A (of a first coupler assembly 400A). A first coupler pivot 401A (of the first coupler assembly 400A) is configured to be pivotally connected to the first base rail 303A (depicted in FIG. 1) of the base assembly 300. In accordance with a preferred embodiment, a first sprocket 408A is mounted (affixed) to the first rotatable axle 411A. The first sprocket 408A is configured to interact with the first flexible elongated drive member 510A. The first flexible elongated drive member 510A is affixed to the first movable rail 203A at spaced-apart connection terminals (211A, 212A). When the motor 512 is energized, the rotatable motor shaft 514 (of the motor 512) rotates the first drivable shaft 524A and the first sprocket 408A, along a shaft rotation direction 528. In response to rotation of the first sprocket 408A, the first sprocket 408A urges selective linear movement of the first movable rail 203A, back and forth along a movement direction 532 (in a reciprocating manner).

Referring to the embodiment depicted in FIG. 26, the second output shaft 522B (of the gear-box assembly 521) is coupled (by a fourth coupler 516D) to a second drivable shaft 524B. The second drivable shaft 524B is coupled (by a fifth coupler 516E) to the second rotatable axle 411B (of a second coupler assembly 400B). A second coupler pivot 401B (of the second coupler assembly 400B) is configured to be pivotally connected to the second base rail 303B (depicted in FIG. 1) of the base assembly 300. In accordance with a preferred embodiment, a second sprocket 408B is mounted (affixed) to the second rotatable axle 411B. The second sprocket 408B is configured to interact with the second flexible elongated drive member 510B. The second flexible elongated drive member 510B is affixed to the second movable rail 203B at spaced-apart connection terminals (211B, 212B). When the motor 512 is energized, the rotatable motor shaft 514 (of the motor 512) rotates the second drivable shaft 524B and the second sprocket 408B, along a shaft rotation direction 528. In response to rotation of the second sprocket 408B, the second sprocket 408B urges selective linear movement of the second movable rail 203B, back and forth along a movement direction 532 (in a reciprocating manner).

Referring to the embodiments depicted in FIG. 26 and FIG. 1, the second drivable shaft 524B is longer in FIG. 26 than the second drivable shaft 524B would be when the motor 512 is mounted to the second movable rail 203B. Similarly, the first drivable shaft 524A is longer in FIG. 26 than the first drivable shaft 524A would be when the motor 512 is mounted to the first movable rail 203A.

Referring to the embodiment depicted in FIG. 26, the actuator assembly 500 further includes at least one lock device 526. The lock device 526 may include a taper lock device, a taper lock bush, a taper bush, a taper-fit bush, or any equivalent thereof. The outside of the lock device 526 may be tapered to match the component bore that is to be disposed on the shaft (not depicted).

Referring to the embodiment depicted in FIG. 26, the lock device 526 is configured to selectively lock and unlock the position of the second rotatable axle 411B to (from) the second coupler assembly 400B. The lock device 526 is movable along a lock movement direction 527. It will be appreciated that the lock device 526 may be configured to selectively lock and unlock the position of the first rotatable axle 411A to the first coupler assembly 400A.

Referring to the embodiment depicted in FIG. 26, when the lock device 526 selectively locks the position of the second rotatable axle 411B to the second coupler assembly 400B, the motor 512 is configured to drive the first and second spaced-apart movable rails (203A, 203B), in unison, by rotation of the first and second sprockets (408A, 408B).

Referring to the embodiment depicted in FIG. 26, when the lock device 526 selectively unlocks the position of the second rotatable axle 411B to the second coupler assembly 400B, the motor 512 is not used (powered off). The first movable rail 203A remains unmoved. The second spaced-apart movable rail 203B can be moved; the movement is done in such a way that the second movable rail 203B is lined-up (aligned) with the first movable rail 203A. Initially, the second movable rail 203B is lined-up (aligned) with the first movable rail 203A. The lock device 526 is installed and selectively locks the position of the second rotatable axle 411B to the second coupler assembly 400B. The motor 512 is energized to drive the first and second spaced-apart movable rails (203A, 203B), in unison, by rotation of the first sprocket 408A and the second sprocket 408B.

It will be appreciated by one of skill in the art that the actuator assembly 500 (including the motor 512) and/or the gear-box assembly 521 may be disposed on either movable rail 203A or movable rail 203B. It will further be appreciated by one of skill in the art that the actuator assembly 500 may be disposed on neither of the movable rails 203A and 203B, for example as depicted in FIG. 26.

It will be appreciated by one of skill in the art that the storage assembly 100 may have one or more movable rails 203, for example one movable rail 203, two movable rails 203A and 203B as depicted in the Figures, or still further movable rails 203. The movable rails 203 may be identical except for the presence of the actuator assembly 500 (including the motor 512) and/or the gear-box assembly 521 on a single movable rail 203. Where the actuator assembly 500 (including the motor 512) and/or the gear-box assembly 521 is disposed on a single movable rail 203, such movable rail 203 may be in a master-slave relationship with all other movable rails 203, the single movable rail 203 having disposed thereon the actuator assembly 500 (including the motor 512) and/or the gear-box assembly 521 being the master rail. Where the actuator assembly 500 (including the motor 512) and/or the gear-box assembly 521 are disposed on none of the movable rails 203 as depicted in FIG. 26, all the movable rails 203 may be identical. Because of the relationship between the identical movable rails 203, the movable rails 203 may advantageously move at the same rate no matter how a load 800 is placed thereon. For example, even if a load 800 is placed entirely on a single movable rail 203 of the storage assembly 100, whether or not a master rail, advantageously operation of the storage assembly 100 may not be affected.

Although the present application has been discussed and embodiments thereof presented in the context of loading and storage with respect to vehicles and roofs thereof, it will be readily appreciated by one of skill in the art that the present invention and embodiments thereof have myriad potential uses and applications, many of which may not relate to vehicles and roofs thereof. For example and without limitation, the present invention has applicability in the field of conveyor belt loading, storage, and unloading with respect to factories and manufacturers. The present invention may have still further applications. Nothing in the present application is to be in any way understood as restricting the scope of the present application to any one or more embodiments presented herein. The present application explicitly contemplates and describes embodiments in which no vehicle or vehicle roof is present.

Figure 27:
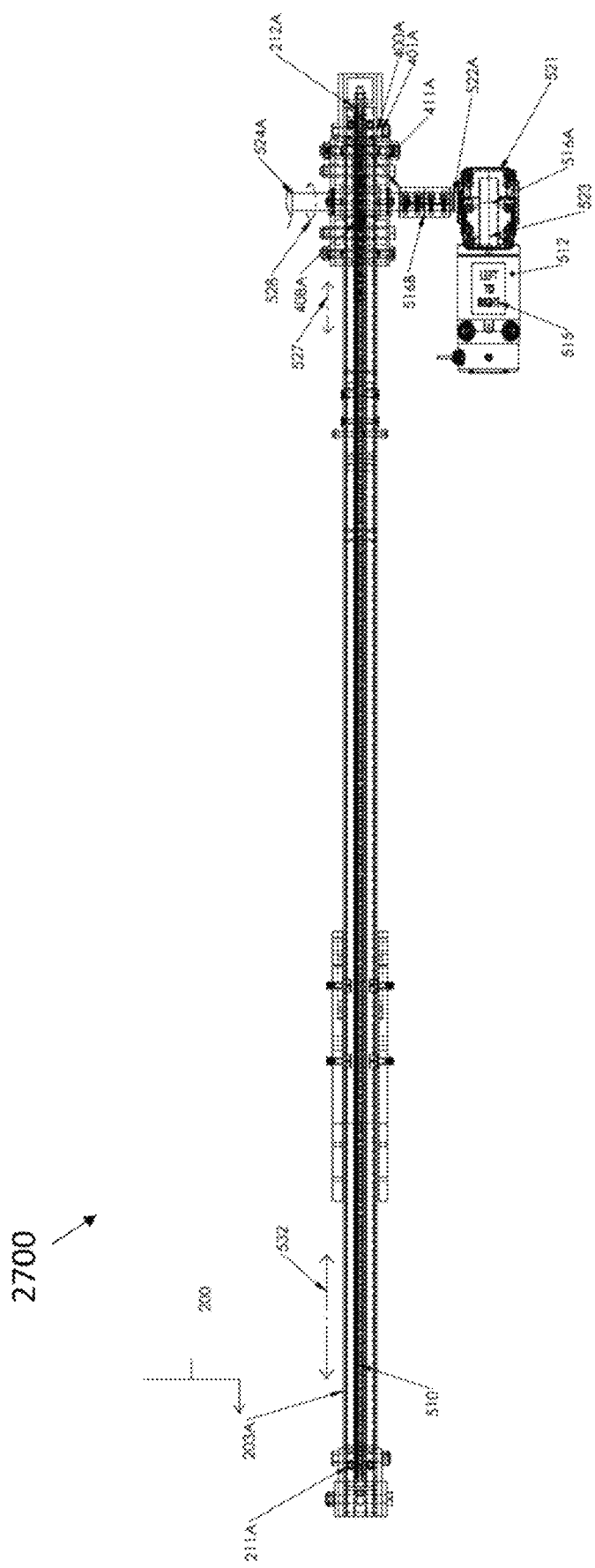
FIG. 27 is a perspective view of a rail, in accordance with an embodiment.

FIG. 27 illustrates a rail 2700, in accordance with an embodiment. The rail 2700 may be similar to the rail of FIG. 26 (i.e., the lefthand large vertical element, or the righthand one), with motor, gearbox, etc. References used in FIG. 27 refer to elements as described with reference to FIG. 26 above.

The following is offered as further description of the embodiments, in which any one or more of any technical feature (described in the detailed description, the summary, and the claims) may be combinable with any other one or more of any technical feature (described in the detailed description, the summary, and the claims). It is understood that each claim in the claims section is an open-ended claim unless stated otherwise. Unless otherwise specified, relational terms used in these specifications should be construed to include specific tolerances that the person skilled in the art would recognize as providing equivalent functionality. By way of example, the term perpendicular is not necessarily limited to 90.0 degrees and may include a variation thereof that the person skilled in the art would recognize as providing equivalent functionality for the purposes described for the relevant member or element. Terms such as "about" and "substantially" relate generally to disposition, location, or configuration that are either exact or sufficiently close to the location, disposition, or configuration of the relevant element to preserve operability of the element within the disclosure that does not materially modify the disclosure. Similarly, unless specifically made clear from its context, numerical values should be construed to include certain tolerances that the person skilled in the art would recognize as having negligible importance as they do not materially change the operability of the disclosure. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options may be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the disclosure. The foregoing has outlined the non-limiting embodiments (examples). The description is made for particular non-limiting embodiments (examples). It is understood that the non-limiting embodiments are merely illustrative as examples.

What is claimed is:

1. An apparatus for use with a load and a vehicle having a vertical lateral side section and a vehicle roof comprising load-bearing portions, the apparatus comprising:
    a storage assembly, including:
        a movable assembly configured to receive the load and support the weight of the load;
        a base assembly configured to be fixedly mounted to the load-bearing portions of the vehicle roof, the base assembly further configured to support movement of the movable assembly with the load, between a load-storage position and a load-access position, when the base assembly, in use, is fixedly mounted to the load-bearing portions of the vehicle roof, and the movable assembly, in use, receives the load and supports the weight of the load; and
        a coupler assembly configured to be pivotally mounted to an outboard end section of the base assembly, the outboard end section disposed proximate to the vertical lateral side section of the vehicle when the base assembly, in use, is fixedly mounted to the load-bearing portions of the vehicle roof;
    wherein the coupler assembly is further configured to be slide coupled to the movable assembly in such a way that the coupler assembly facilitates sliding movement of a length of the movable assembly along an inboard movement direction extending between a first lateral end section and a second lateral end section of the movable assembly.

2. The apparatus of claim 1, wherein:
    in the load-storage position, the movable assembly is disposed proximate to, and above, the vehicle roof, and the movable assembly is alignable in a first orientation so that the load, in use, is transportable by the vehicle; and
    in the load-access position, the movable assembly is disposed proximate to the vertical lateral side section of the vehicle, and the movable assembly is alignable in a second orientation so that the load is removable from, or loadable onto, the movable assembly.

3. The apparatus of claim 1, further comprising:
    a linkage assembly configured to be pivotally connected to the movable assembly, and further configured to be pivotally linked to the base assembly;
    wherein the linkage assembly is further configured to facilitate linear movement of the movable assembly horizontally along an outboard movement direction, from the load-storage position, in which the movably assembly is disposed above the vehicle roof, toward a tippable position beyond which the movable assembly is rotatable.

4. The apparatus of claim 3, wherein:
    the linkage assembly is further configured to facilitate rotational movement of the movable assembly along a rotation movement direction from the tippable position toward the load-access position in which the movable assembly is non-horizontally disposed proximate to the vertical lateral side section of the vehicle so that the load is removable from, or loadable onto, the movable assembly when the movable assembly is disposed non-horizontally.

5. The apparatus of claim 3, wherein:
    the linkage assembly is further configured to facilitate rotational movement of the movable assembly along a counter-rotation movement direction, from the load-access position, in which the movable assembly is non-horizontally disposed proximate to the vertical lateral side section of the vehicle, toward the tippable position in which the movable assembly is positionable in horizontal alignment relative to the vehicle roof.

6. The apparatus of claim 5, wherein:
    the linkage assembly is further configured to facilitate linear movement of the movable assembly horizontally along the inboard movement direction, away from the tippable position and toward the load-storage position disposed above the vehicle roof.

7. The apparatus of claim 6, wherein:
    the base assembly includes:
        an inboard end section disposed proximate to the vertical lateral side section of the vehicle;
        wherein the outboard end section is spaced apart from the inboard end section, the outboard end section being disposed distally from the vertical lateral side section of the vehicle; and
        a base pivot fixedly disposed proximate to the outboard end section, the base pivot configured to interact with the linkage assembly;
        a first elongated track configured to extend between the inboard end section and the outboard end section, the first elongated track configured to interact with the linkage assembly; and
        a second elongated track configured to extend between the inboard end section and the outboard end section, the second elongated track configured to interact with the linkage assembly;
        wherein the first elongated track and the second elongated track are spaced apart from each other and are alignable, at least in part, parallel with each other.

8. The apparatus of claim 7, wherein:
    the first elongated track includes:
        a curved track section disposed proximate to the outboard end section, the curved track section configured to arch toward the movable assembly;
        a first elongated track section extending between the inboard end section and the curved track section, the first elongated track section disposed proximate to the outboard end section; and
    the second elongated track includes a second elongated track section extending from the inboard end section to the outboard end section.

9. The apparatus of claim 7, wherein:
    the linkage assembly includes:
        a first pin configured to be slidably movable along the first elongated track of the base assembly;

a second pin configured to be slidably movable along the second elongated track of the base assembly; and a cam surface configured to slidably interact with the base pivot of the base assembly, the cam surface including:

a straight cam surface configured to linearly slidably interact with the base pivot of the base assembly so that the linkage assembly together with the movable assembly are linearly movable; and a curved cam surface configured to rotatably slidably interact with the base pivot of the base assembly so that the linkage assembly together with the movable assembly are rotatably movable;

wherein, after the tippable position is reached for the movable assembly, the movable assembly is rotatable when the base pivot is positioned where the curved cam surface and the straight cam surface intersect with each other.

10. The apparatus of claim 1, further comprising:

an actuator assembly configured to be fixedly mounted to the coupler assembly, the actuator assembly further configured to be drive coupled to the movable assembly;

wherein the actuator assembly is further configured to selectively urge movement of the movable assembly, relative to the coupler assembly, along the inboard movement direction extending between a first lateral end section and a second lateral end section of the movable assembly.

11. The apparatus of claim 10, wherein:

the actuator assembly is further configured to move the movable assembly along:

the inboard movement direction extending from the first lateral end section toward the second lateral end section of the movable assembly; and an outboard movement direction extending from the second lateral end section toward the first lateral end section of the movable assembly.

12. The apparatus of claim 11, further comprising:

a flexible elongated drive member;

wherein:

the movable assembly is configured to be affixed to the flexible elongated drive member;

the actuator assembly is further configured to be coupled to the flexible elongated drive member; and the actuator assembly is further configured to move the flexible elongated drive member to thereby move the movable assembly.

13. The apparatus of claim 12, wherein:

the movable assembly includes:

a first connection terminal configured to be affixed to a first end of the flexible elongated drive member;

a second connection terminal configured to be affixed to a second end of the flexible elongated drive member;

spaced-apart movable rails; and spaced-apart brace members configured to span between the spaced-apart movable rails.

14. The apparatus of claim 1, further comprising:

a flexible elongated drive member including an elongated chain assembly having links coupled one after another; and wherein the coupler assembly includes:

plates spaced apart from each other;

slide engagement devices configured to slidably engage with the movable assembly;

spacers configured to be positioned between the plates and further configured to maintain the plates in a spaced-apart relationship with each other;

guides configured to guide movement of the flexible elongated drive member;

a sprocket configured to engage with the elongated chain assembly;

a rotatable axle configured to span across the plates and further configured to support the sprocket; and bearings configured to be mounted to the plates and further configured to support the rotatable axle.

15. The apparatus of claim 1, further comprising:

a flexible elongated drive member including an elongated belt assembly;

wherein the coupler assembly includes:

plates spaced apart from each other;

slide engagement devices configured to slidably engage with the movable assembly;

spacers configured to be positioned between the plates and further configured to maintain the plates in a spaced-apart relationship with each other;

guides configured to guide movement of the flexible elongated drive member;

a rotatable axle configured to span across the plates and further configured to frictionally contact the elongated belt assembly; and bearings configured to be mounted to the plates and further configured to support the rotatable axle.

16. The apparatus of claim 1, further including:

an actuator assembly configured to be fixedly mounted to the coupler assembly, the actuator assembly further configured to be drive coupled to the movable assembly, and the actuator assembly further configured to selectively urge movement of the movable assembly, relative to the coupler assembly, along the inboard movement direction extending between the first lateral end section and the second lateral end section of the movable assembly;

a control circuit configured to interface with, and to control, the actuator assembly;

a sensor assembly configured to be disposed proximate to the movable assembly and further configured to determine a position of the movable assembly; and a control switch configured to interface with, and control, the actuator assembly in such a way that the actuator assembly, in use, controls a direction of movement of the movable assembly.

17. The apparatus of claim 1, wherein:

the movable assembly includes a first movable rail and a second movable rail spaced apart from the first movable rail;

the apparatus further includes an actuator assembly configured to selectively move the first movable rail and the second movable rail;

the actuator assembly includes a motor affixed to, and supported by, the base assembly;

the motor includes a rotatable motor shaft configured to rotate a gear-box assembly having an input shaft, a first output shaft and a second output shaft;

the input shaft is configured to be coupled to the rotatable motor shaft of the motor;

the first output shaft is configured to be coupled to a first flexible elongated drive member;

the first flexible elongated drive member is configured to be affixed to the first movable rail;

the second output shaft is configured to be coupled to a second flexible elongated drive member; and the second flexible elongated drive member is configured to be affixed to the second movable rail.

18. The apparatus of claim 17, further comprising:

a lock device configured to selectively lock, and unlock, a second rotatable axle to a second coupler assembly;

wherein when the lock device selectively locks the second rotatable axle to the second coupler assembly, the motor is configured to drive the first movable rail and the second movable rail, in unison;

wherein when the lock device selectively unlocks the second rotatable axle relative to the second coupler assembly, the second movable rail is movable so that the second movable rail is alignable with the first movable rail; and wherein the lock device is further configured to selectively lock the second rotatable axle with the second coupler assembly so that, after the second movable rail and the first movable rail are aligned with each other, the first movable rail and the second movable rail are movable in unison.

19. An apparatus for use with a load, the apparatus comprising:

a vehicle having a vertical lateral side section and a vehicle roof with load-bearing portions; and a storage assembly, including:
a movable assembly configured to receive the load and support the weight of the load;
a base assembly configured to be fixedly mounted to the load-bearing portions of the vehicle roof of the vehicle, the base assembly further configured to support movement of the movable assembly with the load, between a load-storage position and a load-access position, when the base assembly, in use, is fixedly mounted to the load-bearing portions of the vehicle roof, and the movable assembly, in use, receives the load and supports the weight of the load; and
a coupler assembly configured to be pivotally mounted to an outboard end section of the base assembly, the outboard end section disposed proximate to the vertical lateral side section of the vehicle when the base assembly, in use, is fixedly mounted to the load-bearing portions of the vehicle roof;
wherein the coupler assembly is further configured to be slide coupled to the movable assembly in such a way that the coupler assembly facilitates sliding movement of a length of the movable assembly along an inboard movement direction extending between a first lateral end section and a second lateral end section of the movable assembly.

* * * * *